United States Patent [19]
Tahara

[11] Patent Number: 5,956,511
[45] Date of Patent: Sep. 21, 1999

[54] PROGRAM DEVELOPMENT SUPPORT APPARATUS, PROGRAM DEVELOPMENT SUPPORT METHOD, AND STORAGE MEDIUM THEREFOR

[75] Inventor: Yasuyuki Tahara, Kawasaki, Japan

[73] Assignee: Kabushiki Kaisha Toshiba, Kawasaki, Japan

[21] Appl. No.: 08/827,201

[22] Filed: Mar. 28, 1997

[30] Foreign Application Priority Data

Mar. 29, 1996 [JP] Japan .................................. 8-076042

[51] Int. Cl.⁶ .............................. G06F 9/45; G06F 11/00
[52] U.S. Cl. ......................... 395/704; 395/703; 395/706; 710/260
[58] Field of Search ..................................... 395/500, 701, 395/702, 703, 704, 705, 706; 710/260

[56] References Cited

U.S. PATENT DOCUMENTS

| | | | |
|---|---|---|---|
| 4,918,559 | 4/1990 | Hashimoto et al. | 710/265 |
| 5,265,254 | 11/1993 | Blasciak et al. | 395/800.41 |
| 5,307,504 | 4/1994 | Robinson et al. | 395/704 |
| 5,568,649 | 10/1996 | MacDonald et al. | 710/48 |
| 5,572,667 | 11/1996 | Ideta | 710/260 |
| 5,659,760 | 8/1997 | Enami | 710/269 |
| 5,727,227 | 3/1998 | Schmidt et al. | 395/800.36 |
| 5,768,599 | 6/1998 | Yokomizo | 710/260 |

FOREIGN PATENT DOCUMENTS

| | | | |
|---|---|---|---|
| 63-41950 | 2/1988 | Japan | G06F 11/28 |
| 5-233365 | 9/1993 | Japan | G06F 11/28 |

*Primary Examiner*—James P. Trammell
*Assistant Examiner*—Demetra R. Smith
*Attorney, Agent, or Firm*—Finnegan, Henderson, Farabow, Garrett & Dunner, L.L.P.

[57] ABSTRACT

A program development support apparatus and method for supporting the efficient development of a highly reliable program are provided. The basic configuration includes a program-outputting which outputs the source code of a program, a specifying which specifies one or more candidate locations at which an interrupt task is to be enabled in the source code of the program, executing the program so that the interrupt task is executed at a specified location, outputting the results of this execution, inputting an evaluation of whether or not these results are correct, and adding to the program an interrupt control command which enables execution of an interrupt task at the candidate location when the specified candidate location and interrupt task evaluation is positive. In one other configuration, by specifying the interrupt-enabled part, it is possible to resolve a bug in the concurrent program which is caused by a missing interrupt-disabling part. In the other configuration, because a scenario such as used in hyper-sequential programming is employed in development of the concurrent program, an understanding of the contents of the concurrent program is facilitated, thereby improving reliability and the efficiency of the program development process.

14 Claims, 28 Drawing Sheets

```
/* INTERRUPT TASK */ void intr_task()
{
  job101();                             /* EXECUTE JOB 101 */
  exit(1);
}

/* MAIN TASK */ main()
{
  static int flag;
  void job11(),job12(),job13(),job14(),job15();
  static void intr_task();

job11();                              /* EXECUTE JOB 11 */
  if (flag == 0) {
    job12();                            /* EXECUTE JOB 12 */
    job13();                            /* EXECUTE JOB 13 */
    } else {
      job14();                          /* EXECUTE JOB 14 */
      job15();                          /* EXECUTE JOB 15 */
    };
}
```

*Fig. 3*

INTERRUPT TASK

```
void intr_task()
{
  job101();              /* EXECUTE JOB 101 */
  exit(1);
}
```
— 50

MAIN TASK

```
main()
{
  static int flag;
  void job11(),job12(),job13(),job14(),job15();
  static void intr_task();

job11();                       /* EXECUTE JOB 11 */
  if (flag == 0) {
    job12();                     /* EXECUTE JOB 12 */
    job13();                     /* EXECUTE JOB 13 */
  } else {
    job14();                     /* EXECUTE JOB 14 */
    job15();                     /* EXECUTE JOB 15 */
  };
}
```
— 51

*Fig. 4*

```
main()
{
    static int flag;
    void job11(),job12(),job13(),job14(),job15();
    static void intr_task();

job11();                    /* EXECUTE JOB 11 */
    if (flag == 0) {
        job12();                /* EXECUTE JOB 12 */
        intr_permit(intr_task)  /* INTERRUPT-ENABLED PART WITH RESPECT
                                   TO INTERRUPT TASK intr_task */
        job13();                /* EXECUTE JOB 13 */
    } else {
        job14();                /* EXECUTE JOB 14 */
        job15();                /* EXECUTE JOB 15 */
    };
}
```

Fig. 7

```
main()
{
    static int flag;
    void job11(),job12(),job13(),job14(),job15();
    static void intr_task();

job11();                      /* EXECUTE JOB 11 */
    if (flag == 0) {
        job12();                  /* EXECUTE JOB 12 */
        intr_permit(intr_task)    /* INTERRUPT-ENABLED PART WITH RESPECT
                                     TO INTERRUPT TASK intr_task */
        job13();                  /* EXECUTE JOB 13 */
    } else {
        job14();                  /* EXECUTE JOB 14 */
        intr_permit(intr_task)    /* INTERRUPT-ENABLED PART WITH RESPECT
                                     TO INTERRUPT TASK intr_task */
        job15();                  /* EXECUTE JOB 15 */
        intr_permit(intr_task)    /* INTERRUPT-ENABLED PART WITH RESPECT
                                     TO INTERRUPT TASK intr_task */
    };
}
```

Fig. 8

```
main()
{
  static int flag;
  void job11(),job12(),job13(),job14(),job15();
  static void intr_task101();
  static void intr_task102();

job11();
  if (flag == 0) {
    intr_on(intr_task102)
    job12();
    intr_permit(intr_task101)
    job13();
    } else {
    intr_off(intr_task102)
      job14();
    intr_permit(intr_task101)
      job15();
    intr_permit(intr_task101)
    };
}
```

*Fig. 10*

```
int M1, M2 ; /* SHARED VARIABLES */ process p1()
{
  init(M1) ;
  init(M2) ;
  job11 ;
  read(M1) ;
  job12 ;
  write(M2) ;
  job13 ;
} process p2()
{
  read(M1) ;
  job21 ;
  write(M1) ;
} process p3()
{
  read(M2) ;
  job31 ;
  write(M2) ;
}
```

*Fig. 14*

```
int M1, M2 ; /* SHARED VARIABLES */ process p1()
{
  init(M1) ;
  intr_on(P2) ;  /* START OF INTERRUPT-ENABLED PART */
  init(M2) ;
  job11 ;
  intr_off(P2) ; /* END OF INTERRUPT-ENABLED PART */
  read(M1) ;
  job12 ;
  write(M2) ;
  intr_on(P3) ;  /* START OF INTERRUPT-ENABLED PART */
  job13 ;
  intr_off(P3) ; /* END OF INTERRUPT-ENABLED PART */
}
```

```
int M1, M2 ; /* SHARED VARIABLES */ process p1()
{
   init(M1) ;
   intr_on(P2) ;   /* START OF INTERRUPT-ENABLED PART */
   init(M2) ;
   intr_on(P3) ;   /* START OF INTERRUPT-ENABLED PART */
   job11 ;
   read(M1) ;
   job12 ;
   write(M2) ;
   job13 ;
   intr_off(P2) ; /* END OF INTERRUPT-ENABLED PART */
   intr_off(P3) ; /* END OF INTERRUPT-ENABLED PART */
}
```

*Fig. 23*

```
#include <signal.h>

/* INTERRUPT TASK */ void intr_task()
{
  job101();                              /* EXECUTE JOB 101 */
  exit(1);
}

/* MAIN TASK */ main()
{
  static int flag;
  void job11(),job12(),job13(),job14(),job15();
  static void intr_task();

signal(SIGINT, intr_task);             /* INTERRUPT TASK SETTING */
  job11();                               /* EXECUTE JOB 11 */
  if (flag == 0) {
    job12();                             /* EXECUTE JOB 12 */
    job13();                             /* EXECUTE JOB 13 */
    } else {
      job14();                           /* EXECUTE JOB 14 */
      job15();                           /* EXECUTE JOB 15 */
    };
}
```

*Fig. 28*

PROGRAM DEVELOPMENT SUPPORT APPARATUS, PROGRAM DEVELOPMENT SUPPORT METHOD, AND STORAGE MEDIUM THEREFOR

BACKGROUND OF THE INVENTION

1. Field of the Invention

The present invention relates to an improved program development support apparatus and program development support method for supporting the development of a program which includes a main task and a task which interrupts the main task. More particularly, the present invention relates to an apparatus and method suitable for the case of performing testing and debugging for the purpose of creating a concurrent program that has high reliability. Note that, in the present application, "process" is a synonym of "task".

2. Description of Prior Art

In developing a computer program, for frequent interaction with the user and coding processing when an abnormality occurs, it is necessary to code interrupt processing. Interrupt processing is executed when, during execution of the principle processing of the program (called the main task), a specific condition occurs, the main task being temporarily interrupted, during which time separate processing is performed as an interrupt task. After the execution of an interrupt task, there are cases in which the main task is restarted from the point at which it was interrupted, and cases in which it is reperformed from the beginning. There are also cases in which the interrupt task is continued as an another (second) main task without being terminated.

For example, in the program shown in FIG. 28, the interrupt task intr_task is a task which performs processing so as to cause an interrupt and, after execution of task job101, cause abnormal termination if an interrupt signal is generated during the execution of the main task shown at the bottom of FIG. 28. The main task is a task that performs the principle processing in the system, this task executing job11 through job15 in the following sequence. Specifically, first job11 is executed, and if the variable flag value is 0, execution is performed in the sequence of job12 followed by job13. If, however, the value of flag is not 0, job14 and then job15 are executed, after which a normal termination is made.

Note that the execution of the command signal (SIGINT, intr task); creates the interrupt-enabled condition, after which the interrupt task is executed when the interrupt signal (SIGINT) is generated. For this reason, if the interrupt signal is generated during the execution of job12, for example, the execution sequence is job11, job12 (until its interruption), and then job101. In general, the interrupt signal can be generated after any executable step within the main task. Therefore, in the program which is shown in FIG. 28, the number of timings of the execution of the interrupt task is the total number of executable steps included in job11 through job15.

In developing a computer program, the detection and correction of bugs in the program, that is, the processing known as debugging, greatly affects the program development efficiency.

In a conventional debugging process, the method employed is to execute a program having a bug one step at a time, and to display the system state after each step is executed, thereby identifying the location at which execution is not performed as intended by the user, this location being the bug location.

However, when debugging a program having interrupt processing, as described above, various processing patterns can occur, depending on the timing at which the interrupt task is executed. Therefore, with the prior art method of executing one step at a time and verifying the results, because of the excessive number of execution patterns that are to be verified, a problem existed in terms of difficulty of finding and eliminating all bugs.

When actually executing a program, it is rare to have the interrupt task executed at every timing, it often being the case that it is sufficient to execute the interrupt task at a certain appropriate timing. Therefore, a method is desired in which the case in which the interrupt task is executed at this appropriate timing is that in which there is no bug, with the interrupt task not being executed at other timings when there is a possibility of a bug occurring.

A concurrent program one in which a plurality of processes are executed simultaneously in concurrent. The development of a concurrent program is more difficult than that of a sequential program, and in particular with testing and debugging methods of the past, because of the indeterminate behavior of a concurrent program, there are problems of an explosive increase in the number of test cases and a lack of bug repeatability, this making the process an extremely difficult one. With regard to interrupt processing in particular, whereas in the past a programmer would clearly code an "interrupt disabling part" into a program, because a determination of whether or not the "interrupt disabling part" has a omission requires a view of the overall program, bugs occurred because of omission in this "interrupt disabling part."

A known technology for improving a method of concurrent program development is hyper-sequential programming (as described in Japanese patent application H6-114668). Hyper-sequential programming removes all indeterminacy from a concurrent program and debugs the program in a sequentialized state, and then re-inserts favorable indeterminacies and harmless indeterminacies into the program to restore the concurrent program.

In hyper-sequential programming, the source code for each process is divided into sections which are units that are execution-controllable, dependency relationships between sections being detected. Then, every execution sequence between sections is expressed as, for example, a network structure state transition diagram (scenario). In the scenario, each state is shown at a nodes which represent all sections that can be executed from that state extending from the node to the next state. In the case in which a particular combination of commands would form separate paths, depending upon the sequence thereof, the paths merge at a node. In a scenario such as this, in which branching of sections have a dependency relationship, a harmful indeterminacy is eliminated by selecting the branching of a section to be executed first and deleting the others. For a branch in which either may be executed first, by leaving both, a favorable indeterminacy or harmless indeterminacy is maintained.

In the above-noted kind of hyper-sequential programming, by controlling the execution sequence so as to suppress a harmful indeterminacy while leaving harmless or favorable indeterminacy, it is possible to gain the advantage of flexibility provided by concurrent programming.

However, because prior art hyper-sequential programming was chiefly directed at concurrent programming for concurrent-processing computers and was not for the purpose of programming interrupt processing, which is characteristic of microcomputers used for control applications, there was a desire to develop a technique which is suitable for the programming of interrupt processing.

The present invention was proposed for the purpose of resolving the above-noted drawbacks in the prior art, and has as an object the efficient support of the development of highly reliable programs. Another object of the present invention is the creation of a highly reliable concurrent program by specifying a part of a concurrent program in which interruption is possible. Yet another object of the present invention is to reduce omissions in the interruptable part by automatically extending the part in which interruption is possible.

Another object of the present invention is to facilitate the understanding of the contents of a concurrent program, using a scenario such as is used in hyper-sequential programming. Yet another object of the present invention is to improve the efficiency of development of a concurrent program by easy creation of a scenario which represents the desirable behavior of the concurrent program.

Another object of the present invention is to extract and detect from a concurrent program dependency relationships and precedence constraints, enabling extension of the interruptable range based on the results thereof. Yet another object of the present invention is to improve the precision of a concurrent program, even in the case in which an inhibit-enabled part is specified, as in the past.

SUMMARY OF THE INVENTION

To achieve the above-noted objects of the present invention, one aspect of the present invention is a program development support apparatus which supports the development of a program which includes a main task and a task which interrupts the main task, this apparatus having means for specifying a candidate location within the source code of a program at which it is possible to allow execution of an interrupt task, the above-noted program being executed so that the above-noted interrupt task is executed at the thus-specified candidate location, and a means for adding to the above-noted program, based on these execution results, an interrupt control command which allows execution of the interrupt task at the candidate location.

In this aspect of the present invention, the program is executed so that the interrupt task is executed at the specified candidate location, and it is possible to verify whether the execution results are correct or not. Only in the case of input of a positive evaluation is an interrupt control command which allows execution of the interrupt task at the candidate location added. In a program to which a control command is added in this manner, an interrupt is generated only at a location, that is, timing, for which the results were verified as being correct. For this reason, bugs related to the interrupt are effectively eliminated, enabling development of a highly reliable program.

Additionally, because it is possible to specify a candidate location, it is possible to perform debugging at only the timing at which an interrupt is required, thereby improving the efficiency of the debugging process.

Another aspect of a program development support apparatus according to the present invention has means for specifying a part of a concurrent program, which includes a plurality of processes related to interrupt processing, at which interrupt is possible, and means for adding to the above-noted concurrent program an interrupt control command which allows execution of the interrupt task at the thus specified interrupt-enabled part.

In this aspect of the present invention, the part of a concurrent program in which interruption is allowed is clearly specified. While it is necessary to view the overall program to determine whether or not there is a missing part of the interrupt-disabled part, it is possible to make a judgment with regard to the correctness of an interrupt-enabled part by viewing just that location. For this reason, by specifying the interrupt-enabled part, it is possible to resolve a bug in a concurrent program which is caused by a missing interrupt-disabling part.

DESCRIPTION OF THE DRAWINGS

FIG. 3 is a drawing which shows one example of a program in the first embodiment of the present invention.

FIG. 4 is a drawing which shows a display example of a program in the first embodiment of the present invention.

FIG. 7 is a drawing which shows the results of adding one control command to the source code shown in FIG. 3 in the first embodiment of the present invention.

FIG. 8 is a drawing which shows the results of adding a plurality of control commands to the source code shown in FIG. 3 in the first embodiment of the present invention.

FIG. 10 is a drawing which shows the source code to which a control command has been added in the case of positive simulation results according to the specification shown in FIG. 9 in the second embodiment of the present invention.

FIG. 14 is a drawing which shows an example of a concurrent program in the third embodiment of the present invention.

FIG. 17 is a drawing which shows a concurrent program to which a command that enables interruption has been added in the third embodiment of the present invention.

FIG. 22 is a drawing which shows the extracted interrupt-enabled part (a) and extended interrupt-enabled part (b) in the fourth embodiment of the present invention.

FIG. 23 is a drawing which shows an example of a concurrent program to which a command that controls an interrupt has been added in the fourth embodiment of the present invention.

FIG. 28 is a drawing which shows a program using the prior art.

DETAILED DESCRIPTION OF THE PREFERRED EMBODIMENTS

Preferred embodiments of the present invention will now be described in detail, with reference being made to the relevant accompanying drawings.

1. First Embodiment

The first embodiment of the present invention corresponds to the present invention as recited in claims 1 and 4, and is a program development support apparatus for the support of development of a program which includes a main task and a task which interrupts the main task, and program development support method which is executed in this program development support apparatus. An object of the first embodiment is to provide a program development support apparatus and program development support method which efficiently support the development of a highly reliable program.

(1) Configuration

Figure 1:
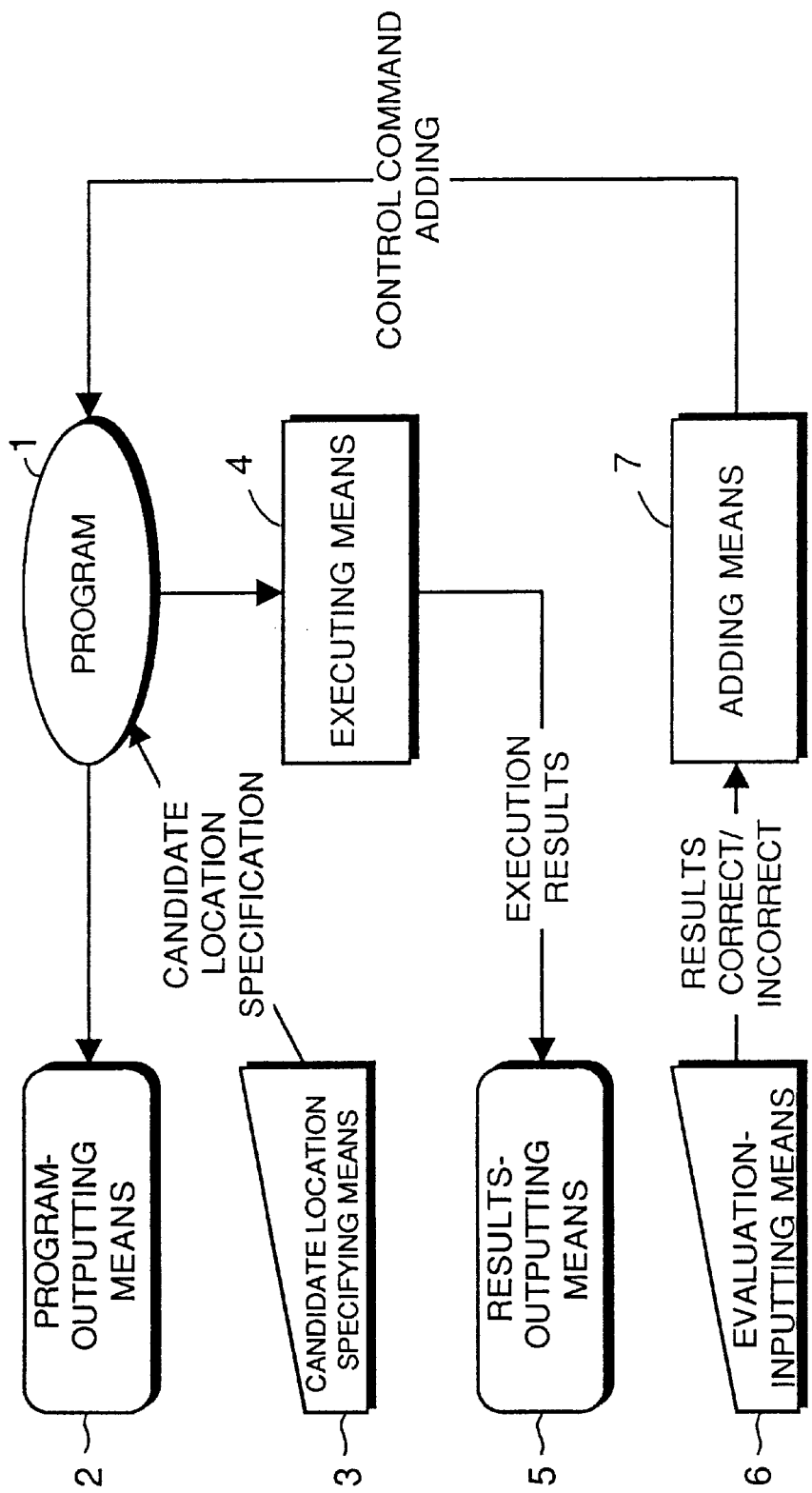
FIG. 1 is a functional block diagram which shows the configuration of the first embodiment of the present invention.

FIG. 1 shows the configuration of computer program development support apparatus according to the first embodiment. As shown in this drawing, this apparatus has a program outputting means 2 which outputs the source code of a program 1, and a specifying means 3 for specifying one or more candidate locations within the above-noted source code at which it is possible to allow execution of an interrupt task.

This apparatus also has an execution means 4 for executing the program so that an interrupt task is executed as a specified candidate location, and a results-outputting means 5 for outputs the results of this execution.

The apparatus further has an evaluation-inputting means 6 for inputting a correct/incorrect evaluation with respect to the thus-output results, and an adding means for adding to the above-noted program an interrupt control command which enables execution of an interrupt task at the above-noted candidate location when the above-noted evaluation with regard to the specified candidate location and interrupt task is input as being correct.

Although these elements are not shown in the drawing, the apparatus further has an input device such as a keyboard or pointing device, and an output device such as a display or printer, these input and output devices being used to perform program editing such as program input and modification, input of various commands, and display of the execution condition when a program is executed.

The storage area which is required as program storage and as a working area at various stages of work is provided by a memory or magnetic disk apparatus or the like, which is not shown in the drawing.

(2) Operation

Figure 2:
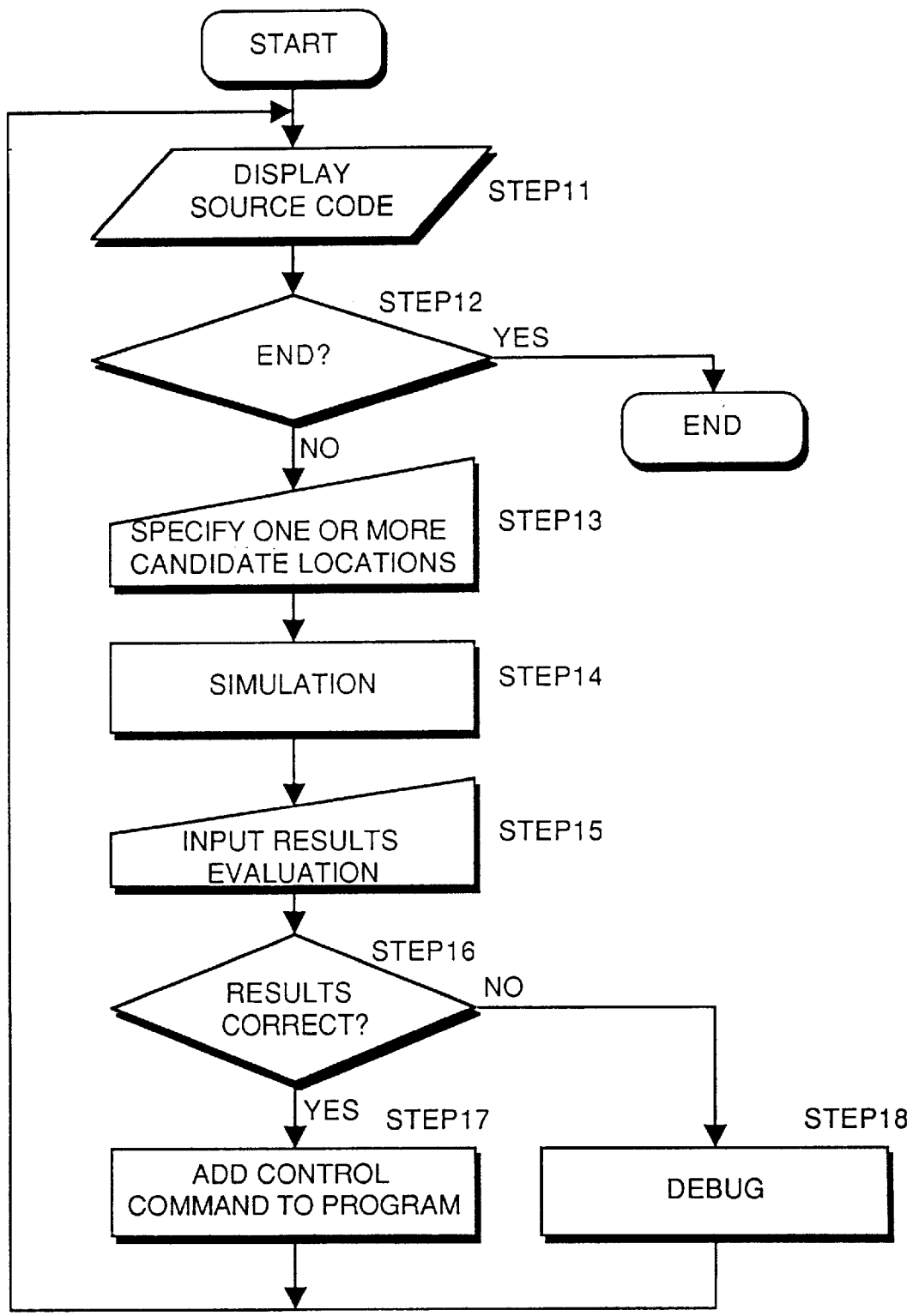
FIG. 2 is a flowchart which shows the processing sequence in the first embodiment of the present invention.

The operation of the first embodiment, having a configuration as described above, is as follows. FIG. 2 is a flowchart which shows the processing sequence in the first embodiment of the present invention.

[Program Output Processing]

First, the program outputting means 2 displays the source code of the program (step 11). This type of source code can be thought of as usually being debugged for parts other than interrupts, and does not have interrupt control commands added to it.

FIG. 3 shows a program example, and FIG. 4 shows a display example of the program. As can be seen in FIG. 4, the interrupt task and main task are displayed in the separate display regions 50 and 51. The contents of each of the tasks illustrated in FIG. 3 are similar to the program of FIG. 11 in the prior art, the only difference between the two being whether or not an interrupt setting is made in the main task.

[Candidate Specification Processing]

The user specifies, via the candidate specifying means 3, one or more candidate locations at which the execution of an interrupt task is to be enabled (step 13). This specification is made, for example, by indicating the location before or after an execution unit in the source code of the main task, and more specifically is made by pointing and clicking the mouse cursor between lines or by inputting a line number from a keyboard.

Figure 5:
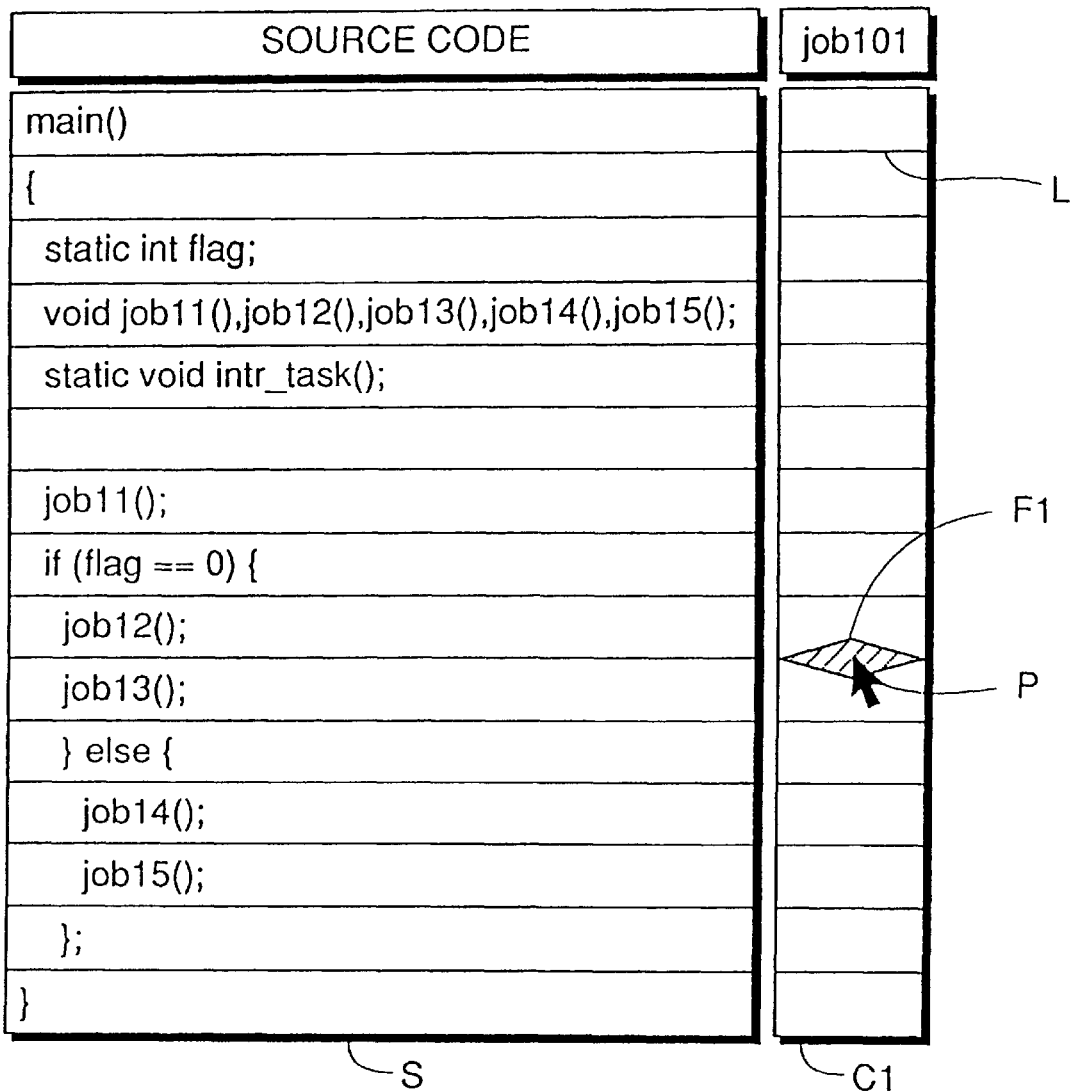
FIG. 5 is a drawing which shows a display example of a screen used to specify a candidate location in the first embodiment of the present invention.

FIG. 5 is a drawing which shows a display example of the screen used to specify a candidate location in the first embodiment of the present invention. In this drawing, on the right side of the source code display region S, a selectable candidate location is displayed in the vertically oriented rectangular display region C1. In this rectangle C1, positions corresponding to locations between lines of the source code are indicated by the horizontal lines L.

In the above-noted display screen, if the mouse pointer P is pointed to a horizontal line L corresponding to a desired interline position and is clicked at that position using the mouse button, that position will be specified as a candidate location, and a diamond-shaped mark F1 will appear at the thus-specified location. In FIG. 5, the location between the command job12 ( ); and the command job13 ( ); is specified as a candidate location.

Figure 6:
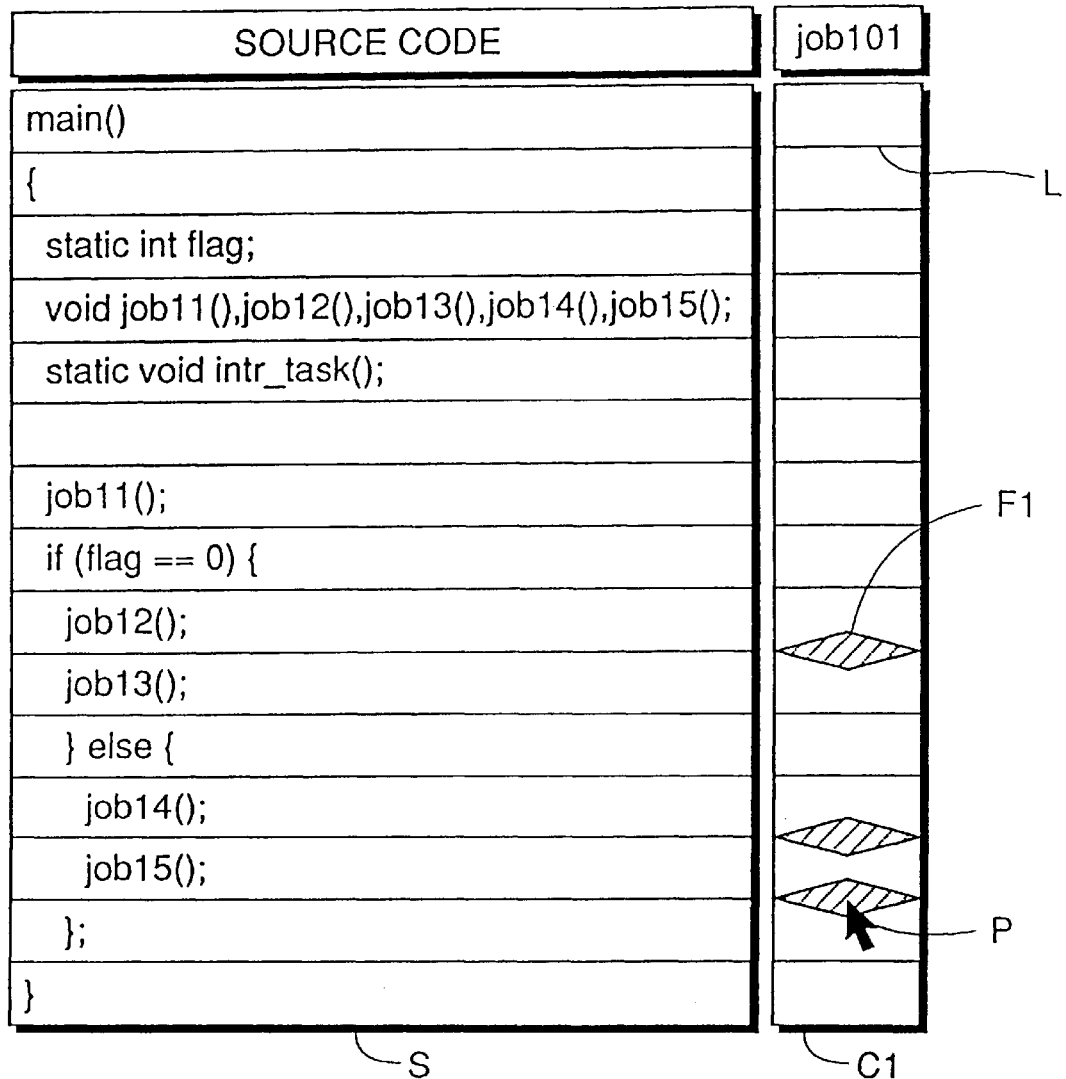
FIG. 6 is a drawing which shows a display example of a screen in the condition in which a plurality of candidate locations have been specified in the first embodiment of the present invention.

By repeating the above-noted operation, it is possible to specify a plurality of candidate locations in the same manner. By doing this, it is possible to perform a simulation for each combination of candidate locations. FIG. 6 is a drawing which shows a display example of a screen in which a plurality of candidate locations has been selected.

[Execution Processing and Results Output Processing]

Next, the execution means 4 executes the program so that an interrupt task is executed at a location specified as a candidate location (step 14). It is possible to perform this execution as an interpreter-type simulation.

Specifically, first the main task execution is started. When the above-described interrupt-enabled part is encountered, the main task execution is interrupted, and the interrupt task is executed. For example, in the case in which an interrupt-enabled part is specified after the job12 ( ); in FIG. 3, after the execution of job12 ( );, that is, after the execution of job 12, the interrupt task is executed. In this case, because the interrupt task terminates abnormally, the overall program execution terminates abnormally. The execution results are output from the results-outputting means 5.

[Evaluation Input Processing and Control Command Adding Processing]

The user makes a judgment of correct or incorrect with regard to the thus-output execution results, and the judgment of correct or incorrect with regard to the thus-output execution results is input from the evaluation-inputting means 6 (step 15).

If input to the effect that the execution results are "correct" is made, the adding means 7 adds an interrupt control command, which enables the execution of an interrupt task, to the above-noted candidate location (step 17). This addition is made by inserting the interrupt task name at the position in the source code corresponding to the candidate location. FIG. 7 shows the result of adding one control command, as shown in FIG. 5, to the source code of FIG. 3, and FIG. 8 shows the results of adding a plurality of control commands to such as shown in FIG. 6 to the source code of FIG. 3.

If input to the effect that the execution results are "incorrect" is made, the user performs debugging, such as correction of the source code (step 18). In this case, it is also possible to display a message on a display screen as a debugging prompt to the user.

If an immediately previously specified candidate location is maintained when performing debugging (step 18), when performing simulation once again after debugging (step 14), it is sufficient to make specification of a candidate location (step 13) for only the changed part.

As described above, in this embodiment of the present invention, it is possible to execute the program so that an interrupt task is executed at a specified candidate location, and to verify the correctness of the execution results. Then, in only the case in which a positive evaluation is input, a control command which enables an interrupt is added at the candidate location. In a program to which such a control command has been added, an interrupt occurs only at a location (timing) at which a correct result has been verified. For this reason, bugs with regard to interrupts are efficiently removed, enabling the development of a highly reliable program.

Additionally, because a candidate location can be arbitrarily specified, it is possible to perform the debugging work at only the actually required timings, thereby improving the efficiency of the debugging.

2. Second Embodiment

In the program development support apparatus and program development support method similar to those of the first embodiment, if a given time span is specified as a candidate location (such as recited in claim 2), or candidate locations corresponding for each task corresponding to different types of a plurality of interrupt tasks are specified in one program (such as recited in claim 3), there is a further improvement in usefulness.

Figure 9:
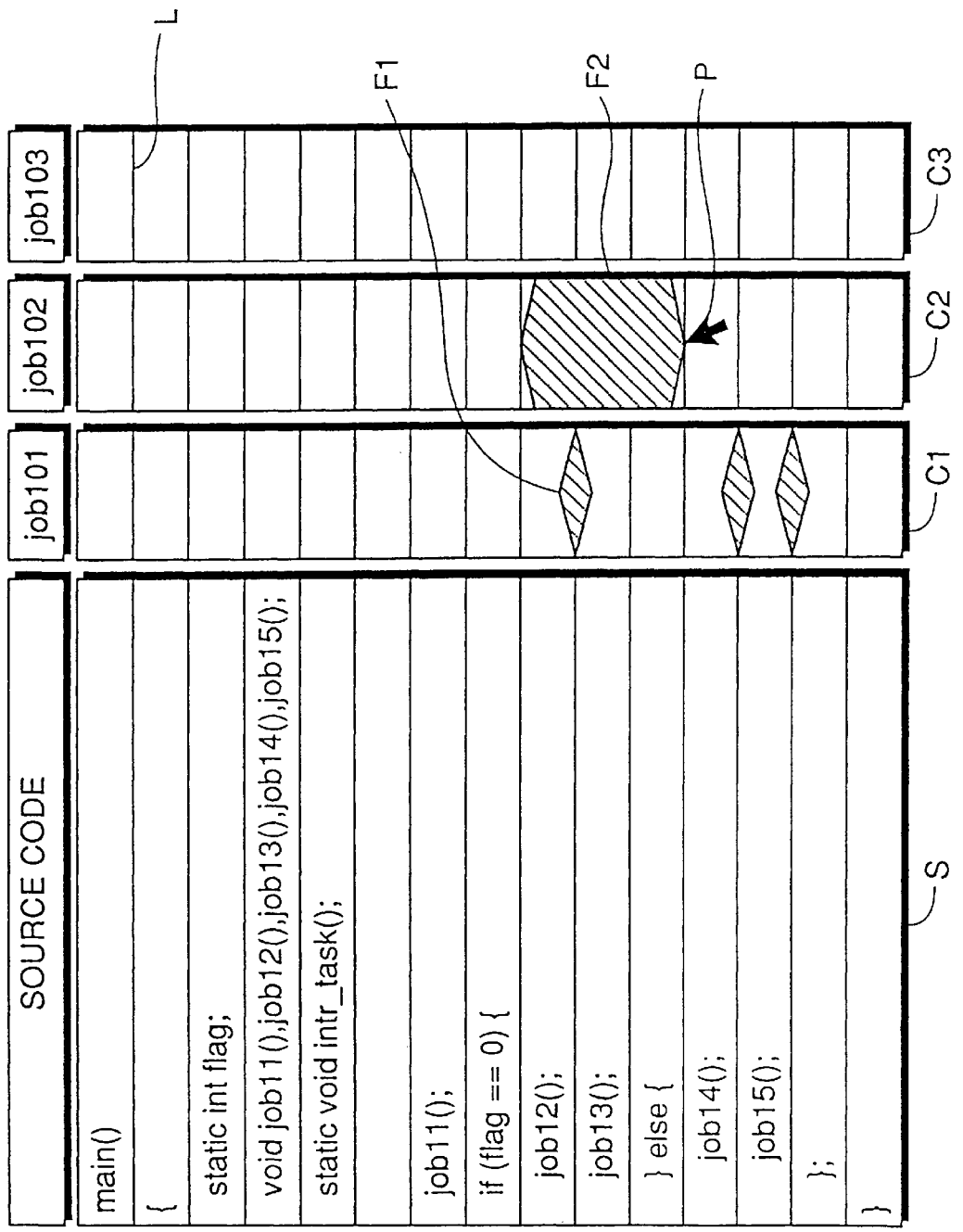
FIG. 9 is a drawing which shows a display example of a screen used to specify a candidate location in the second embodiment of the present invention.

FIG. 9 shows a display example of a screen which is used to specify a candidate location in the second embodiment of the present invention. Specifically, in this drawing, with regard to the three types of interrupt tasks job101, job102, and job103, the display regions C1, C2, and C3, which indicate the selectable candidate locations are displayed. From this screen, by performing the same type of operations as described with regard to the first embodiment, it is possible to specify the desired candidate locations for each of the desired interrupt tasks.

In the case of specifying a time span, first the mouse point P is pointed at the horizontal line L corresponding to the starting position of the interrupt-enabled time span and the mouse is clicked and dragged downward from this position to a horizontal line L corresponding to the ending position of the interrupt-enabled time span, at which point the mouse button is released. By doing this, this range is specified as the candidate location, a prescribed graphic mark appearing which corresponds to the thus-specified range. In FIG. 9, a time span is specified with regard to the interrupt task job102, this specified time span being indicated by the graphic mark F2.

In the case in which a positive evaluation results from a simulation in accordance with the specifications shown in FIG. 9, an example of the source code to which a control command has been added is as shown in FIG. 10. In this drawing, the interrupt task intr_task101 corresponds to job101, and the interrupt task intr_task102 corresponds to job102.

In this drawing, interrupt is enabled thereafter for the interrupt task given as the argument of intr_on( ), and interrupt is disabled thereafter for the interrupt task given as the argument of intr_off( ).

3. Third Embodiment

The third embodiment of the present invention is one in which the user-specified interrupt-enabled part (as recited in claims 5 and 11) is extended (as recited in claims 8 and 9).

(1) Configuration

Figure 11:
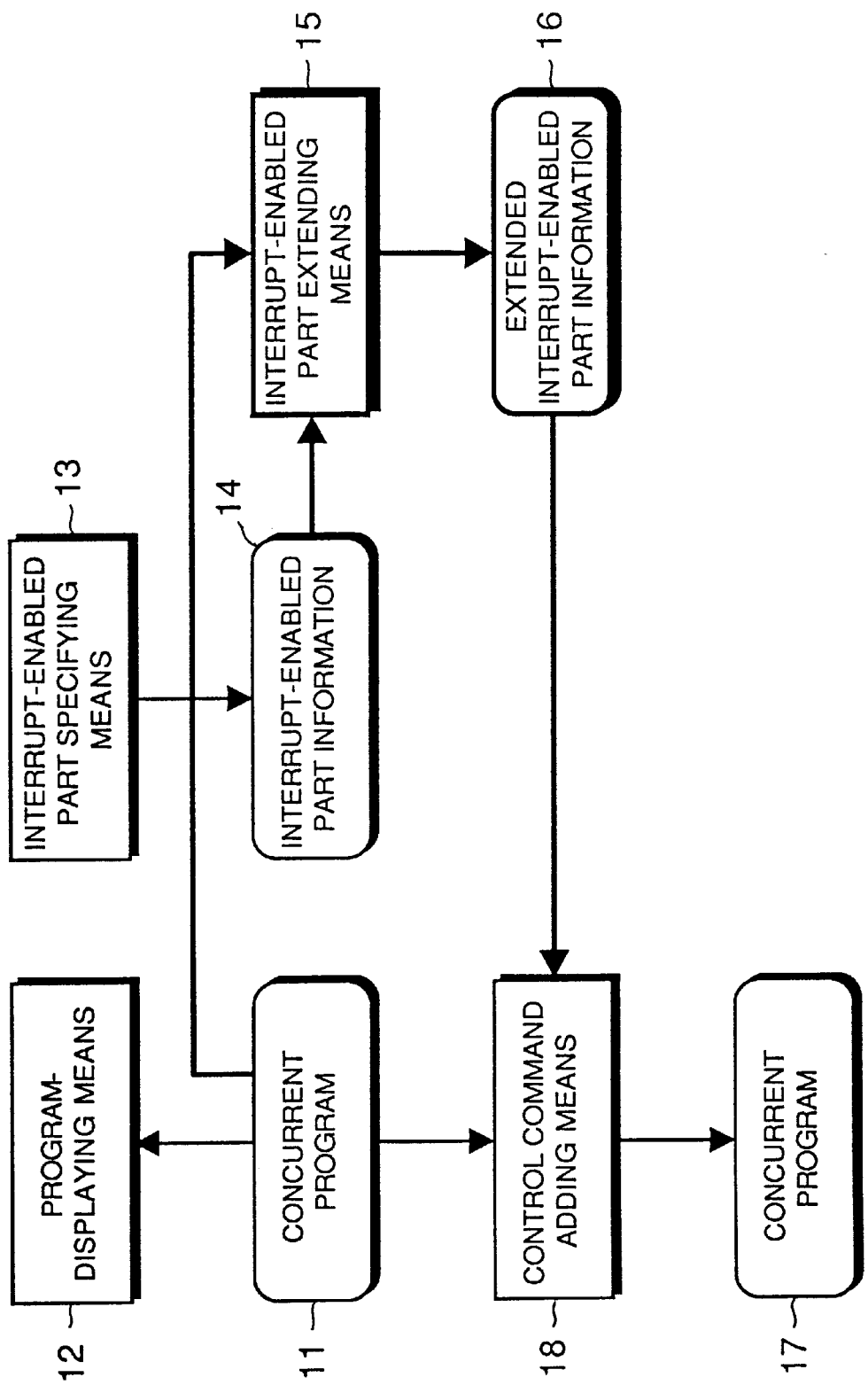
FIG. 11 is a functional block diagram which shows the configuration of the third embodiment of the present invention.

FIG. 11 is a functional block diagram that shows the configuration of the third embodiment of the present invention. As shown in this drawing, the third embodiment has a program-displaying means 12 for displaying a concurrent program 11 which includes a plurality of processes related to interrupt processing, and an interrupt-enabled part specifying means 13 for specifying an interrupt-enabled part of the concurrent program 11. The third embodiment also has an interrupt-enabled part extending means 15 for extending the interrupt-enabled part of the concurrent program 11 in accordance with a prescribed criterion, based on information 14 about the specified interrupt-enabled part, and a control command adding means 18 which, by adding to the concurrent program 11 a control command that enables an interrupt at an interrupt-enabled part, based on information 16 about the extended interrupt-enabled part, outputs a concurrent program 17.

Figure 12:
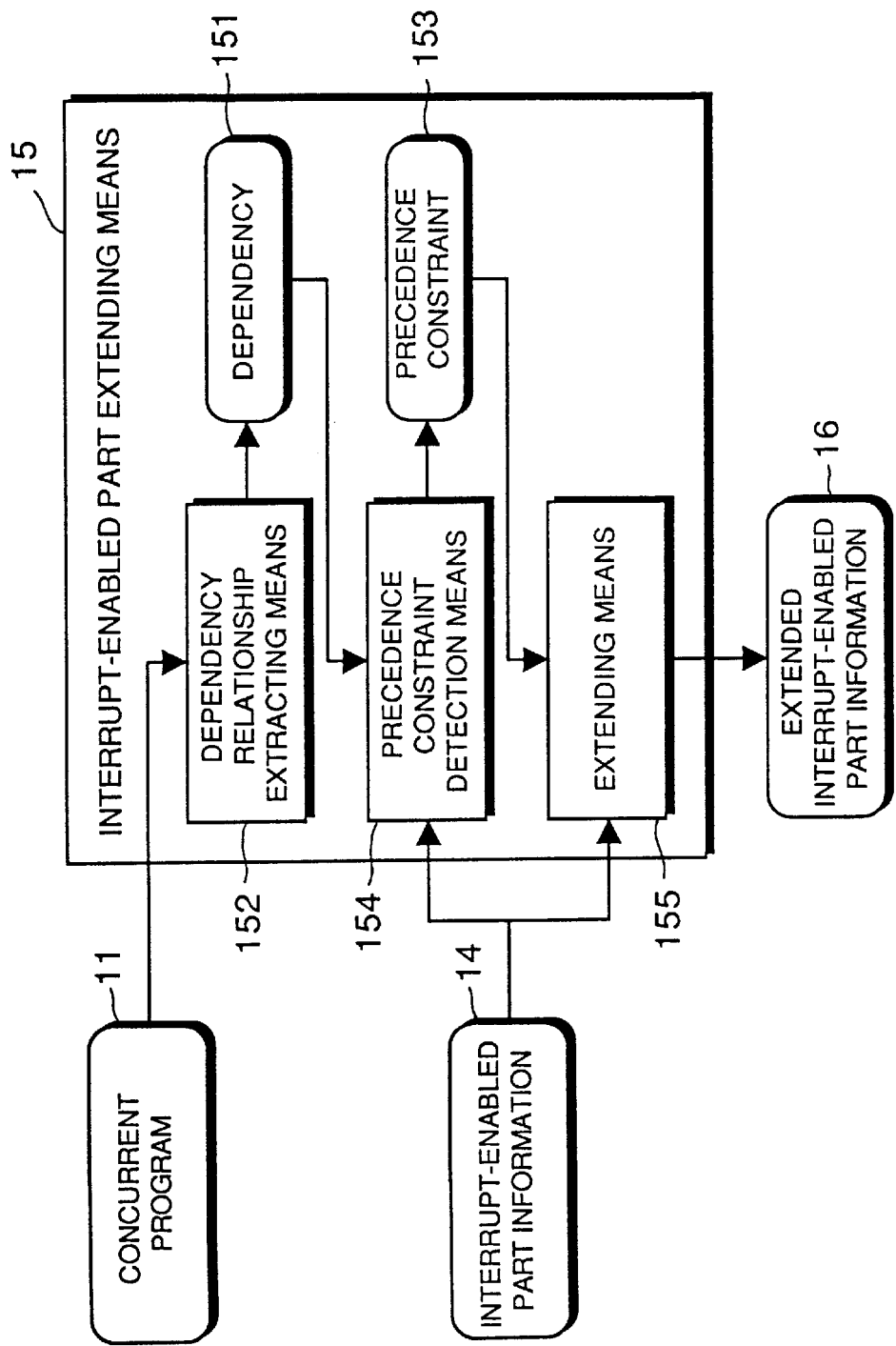
FIG. 12 is a functional block diagram which shows a specific configuration of the interrupt-enabled part extension means 15 in the third embodiment of the present invention.

FIG. 12 is a functional block diagram which shows a specific configuration of the above-noted interrupt-enabled part extending means 15. Specifically, this interrupt-enabled part extending means 15 has a dependency relationship extracting means 152 for extracting a dependency relationship 151 between commands included in the concurrent program 11, a precedence constraint detection means 154 for detecting a precedence constraint 153 which constrains the sequence between control commands based on the extracted dependency relationship 151 and based on the information 14 of the specified interrupt-enabled part, and an extending means 155 for extending the interrupt-enabled part allowed by the detected precedence constraint and outputting the information 16 of the thus-extended interrupt-enabled part.

(2) Operation and Effect

Figure 13:
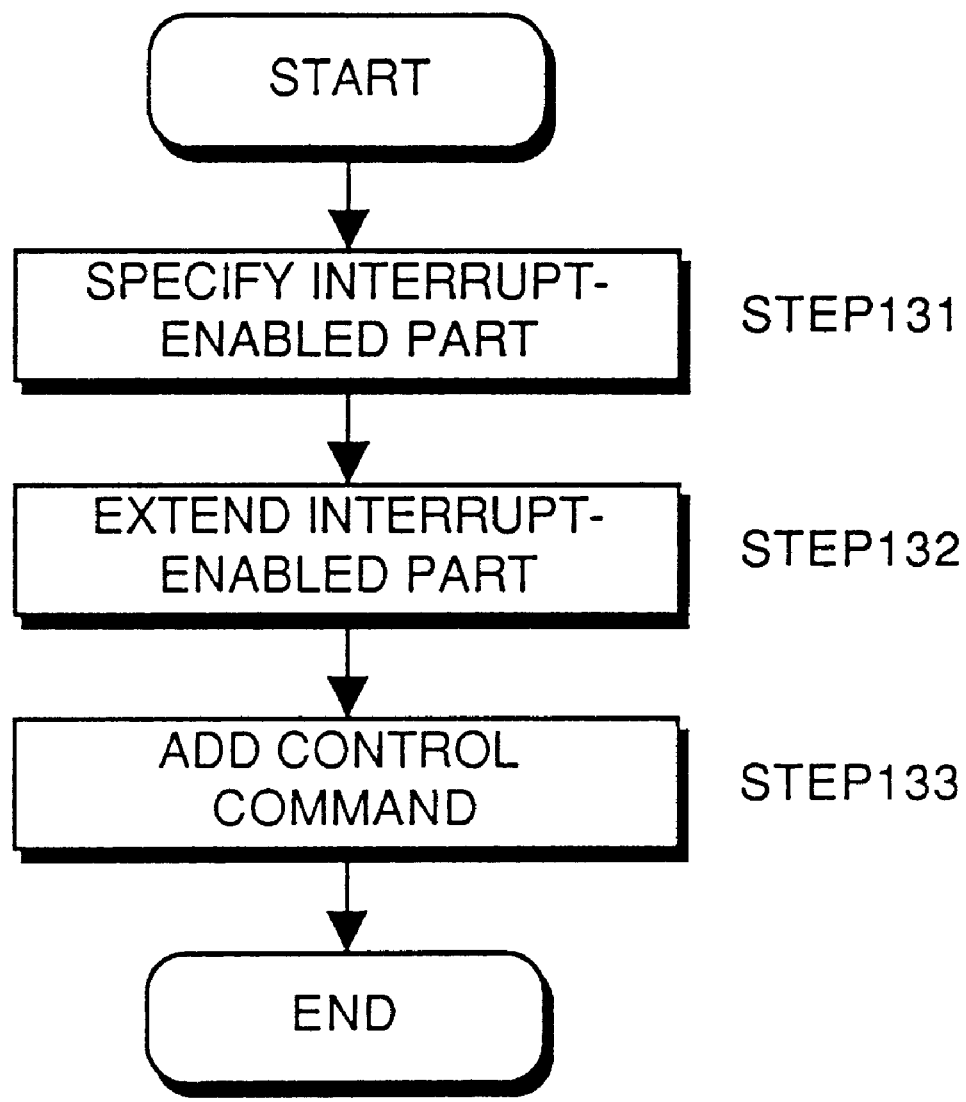
FIG. 13 is a flowchart which shows the processing sequence in the third embodiment of the present invention.

The operation and effect of the third embodiment, having a configuration as described above, are as follows. FIG. 13 is a flowchart which shows the processing sequence in the third embodiment.

(2-1) Interrupt-Enabled Part Specification

Figure 15:
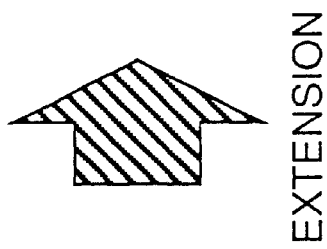
FIG. 15 is a drawing which shows the interrupt-enabled part (a) and extended interrupt-enabled part (b) in the third embodiment of the present invention.

In the case of a program such as shown in FIG. 14 as the concurrent program 11, first the program-displaying means 12 shown in FIG. 11 displays the source code of the given concurrent program 11 for each process. The user uses the interrupt-enabled part specifying means 13 to specify the interrupt-enabled part for each interrupt process (step 131). For example, FIG. 15(a) shows the example of the display of the specification of interrupt-enabled parts in a concurrent program formed by the processes P1, P2, and P3. In this example, the specific source code of the interrupted process P1 is displayed, and specification is made that it is possible for the interrupt processes P2 and P3 to each interrupt the process P1. That is, the process P2 can interrupt the process P1 between the commands job11 and read (M1), and the process P3 can interrupt the process P1 between the commands write (M2) and job13.

In this example, since it is assumed the processes P2 and P3 are not interrupted by other processes, their specific source code is not displayed, nor is specification of any interruption locations performed.

(2-2) Interrupt-Enabled Part Extension

Next, the interrupt-enabled part extending means 15 extends the specified interrupt-enabled part based on a prescribed criterion (step 132). This extension of the interrupt-enabled part is performed in the following sequence.

(2-2-1) Dependency Relationship Extraction

First, the dependency relationship extracting means 152 shown in FIG. 12 extracts a dependency relationship from the concurrent program 11. This "dependency relationship" between two commands is a relationship whereby the execution of one command influences the "results" of the execution of another command. When the execution of either of two commands has no influence on the other, there is no dependency relationship, and it is possible to execute these commands in either sequence, such commands with no mutual dependency relationship being targets for interrupt-enabled part extension. Dependency relationships can be classified as either data dependency or control dependency.

"Data dependency" is a dependency relationship existing because, either directly or indirectly, common data is accessed by the commands. Consider, for example, the following series of commands.

I1: write (M1,A)
I2: A=read (M1)
I3: write (M2,A)
I4: B=read (M2)

In the example shown above, the command I1 (write (M1,A)) writes the contents of the variable A into the memory M1, and the command I2 (A=read (M1)) reads the data from this same memory M1. For this reason, there exists a data dependency between command I1 and command I2.

Furthermore, there is no direct access of the same memory by command I1 and command I4. However, the data written into the memory M1 by the command I1 (write (M1,A)) is read from the memory M1 by the command I2 (A=read (M1)) and written into the memory M2 by the command I3 (write (M2,A)). What the command I4 (B=read (M2)) reads as the variable B is the content of this memory M2, which is content that have been copied from the memory M1 to the memory M2. For this reason, the command I1 which accesses the memory M1 and the command I4 which accesses the memory M2 indirectly access common data, and have between them an indirect dependency relationship. Such data dependencies can be determined by tracing back through shared memories and the propagation of accessed values.

A "control dependency" is relationship existing between a branching command Ib and an arbitrary command Ia, whereby the results of the branching command Ib affects whether or not the command Ia is executed. Consider, for example, the following series of commands.

Ib: if(x !=0) {
Ia: print('Ia')};
Ic: print('Ic');

In the example shown above, in the relationship between the branching command Ib and the command Ia, if the branching condition "x !=0" of the branching command Ib is satisfied, the command Ia is executed, but if it is not satisfied, the command Ia is not executed. For this reason, there exists a control dependency between the branching command Ib and the command Ia. Between the branching command Ib and the command Ic, however, because the command xc is executed without relationship to the branching destination from the branching command Ib, there is no control dependency. It is thus possible to determine a control dependency by tracing back through branching conditions and the range of the influence thereof.

In the extraction of dependency relationships, the method used is a known method described, for example, in J. Ferrantc, K. J. Ottenstein, and J. D. Warren, "The Program Dependence Graph and Its Use in Optimization" ACM Trans. on Programming Languages and Systems, Vol. 9, No. 3, 1987 (reference 1).

For example, in the case in which a command is detected which changes an object in some process, all commands in all other processes the results of which are influenced by the state of the above-noted object of the above-noted command are detected. It is then possible to assume that there is a dependency relationship between the above-noted command which makes the change and all the influenced commands.

A typical example of such a dependency relationship is that of a write command and a read command which access a shared memory. Another example of a dependency relationship is that of a command which changes a flag shared between processes and a command which uses the state of the flag as a condition for a judgment. It can be thought, however, that there is generally no direct dependency relationship between commands which read the same memory. Additionally, it is possible to eliminate a subroutine which only processes a local memory of the specific processor from the possible targets for dependency relationship detection.

In FIG. 14, for example, because there is no branching condition, no control dependency exists, there only being the data dependency between the shared variables M1 and M2. That is, it is possible for data dependencies to exist among the commands init (M1), init (M2), read (M1), write (M1), read (M2), and write (M2) which access the shared variables M1 and M2. Specifically, the following two sets of commands access the same shared variables, so that there can be a data dependency relationship between commands belonging to same set.

Set 1 (commands which access memory M1):
  p1:init (M1),p1:read (M1),p2:read (M1),p2:write (M1)
Set 2 (commands which access memory M2):

p1:init (M2),p1:read (M2),p3:read (M2),p3:write (M2)

In this example, because memory M1 and memory M2 are mutually independent and there is no propagation of values, there is no indirect data dependency relationship between the set of commands which access memory M1 and the set of commands which access memory M2.

(2-2-2) Precedence Constraint Detection

Next, the precedence constraint detection means 154 shown in FIG. 12 extracts precedence constraints 153 in the concurrent program 11, based on a specified interrupt-enabled part and the dependency relationship 151. In the extraction of precedence constraints, the method used is a known method described, for example, in M. Girkar and C. D. Polychronopoulos, "Extracting Task-Level Parallelism, ACM Trans. Prog. Lang. Syst., Vol. 17, No. 4, 1995 (reference 2).

Figure 16:
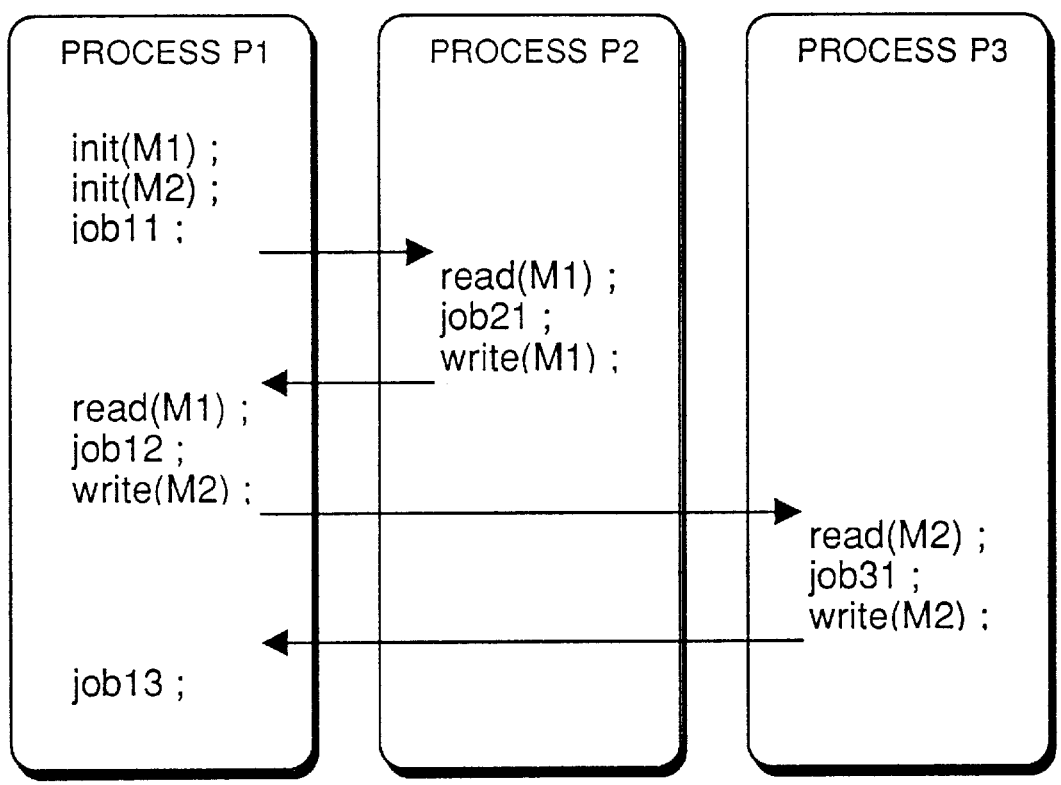
FIG. 16 is a drawing which shows an execution sequence obtained in the third embodiment of the present invention.

Specifically, in the example of FIG. 14, when the program is executed based on the interrupt-enabled part specified as shown in FIG. 15(a), the command execution sequence shown in FIG. 16 is obtained. In this example, there is a unique execution sequence. However, if the specified interrupt-enabled part is wide, it is possible that a plurality of execution sequences exist. In each of the thus-obtained execution sequences, the command execution sequence is totally ordered, and the precedence constraint is extracted from these execution sequences.

Specifically, the term precedence constraint refers to a relationship whereby, in an arbitrary execution sequence of a program according to a specified interrupt-enabled part, with respect to two commands that have a dependency relationship between them, the relative command execution order of the two commands is fixed throughout all possible program execution sequences. For this reason, in all of the possible execution sequences, if it is possible to detect a common execution order between specific commands between which there is a dependency relationship, it is possible to detect the precedence constraint. For example, between the two commands p1:init (M1) and p2:read (M1), there is a precedence constraint that dictates that it is necessary for p1:init (M1) to be executed before p2:read (M1). The precedence constraints obtained from the interrupt-enabled part specified in FIG. 15(a), including the above-noted precedence constraint, are as shown below. In the relationships shown, A<<B indicates means that A must be executed before B.

p1:init (M1)<<P2:read (M1)
p2:write (M1)<<P1:read (M1)
p1:write (M2)<<P2:read (M2)

As long as conformance is maintained to these precedence constraints are preserved, it is possible to extend the interrupt-enabled part beyond the specified interrupt-enabled part.

(2-2-3) Interrupt-Enabled Part Extension

Next, the extending means 155 shown in FIG. 12 extends the interrupt-enabled part, within satisfying the precedence constraint 153 (step 133). For example, consider the case in which the interrupt-enabled part II is specified in the process P1 for interrupt by the process P2. In this case, if there is no precedence constraint between any command of the process P2 and a command I immediately before or immediately after the interrupt-enabled part II of the process P1, the command I is added to the interrupt-enabled part II to extend it. In this process, if extension is possible the extension of the part II is further extended by repetition for a command immediately before or immediately after the command I, this processing stopping when it is no longer possible to continue this extension.

FIG. 15(b) shows the results of this extension. In this example, because there is no precedence constraint between the init (M2) and job11 of process P1 and any command of the interrupt process P2, the interrupt-enabled part for the process P1 with respect to the process P2 is extended to the position immediately after the init (M1). As a special case, between processes that have completely no dependencies between them, interrupt is possible at any arbitrary location.

(2-3) Control Command Addition

Based on the information 16 of the above-noted extended interrupt-enabled part, the control command adding means 18 shown in FIG. 11 adds a control command which controls the interrupt-enabled part to the source code of the process P1 (step 3). FIG. 17 shows an example of a concurrent program to which a control command has been added to control interruption. In this case, because there are no interrupts to the processes P2 and P3, nor are control commands added to them, only process P1 is shown in FIG. 17 and other processes have been omitted from the drawing. When this program is executed, an interrupt is generated only in the extended region indicated in FIG. 15(b).

(2-4) Effect of the Third Embodiment

According to the third embodiment of the present invention having a configuration as described above, by improving the precision of concurrent programming, testing, and debugging, it is possible to create a highly reliable concurrent program. That is, in the third embodiment the interrupt-enabled part within the concurrent program is explicitly indicated. While it is necessary to view and check the overall program to determine whether or not there is a missing part of the interrupt-disabled part, it is possible to make a judgment with regard to the correctness of an interrupt-enabled part by viewing and checking just that location. For this reason, by specifying the interrupt-enabled part, it is possible to resolve a bug in the concurrent program 17 which is caused by a missing interrupt-disabling part.

Additionally, in the third embodiment because the interrupt-enabled part is automatically extended by means of analyzing the concurrent program 11, it is possible to suppress unwanted growth of the interrupt-disabled part, which is the complementary set of the interrupt-enabled part. By doing this, omissions in the interrupt-enabled part are reduced, and a efficient concurrent program 17 is created. For example, in the case in which a process is interrupted by another process, if the interruption is made at the earliest point in time at which the results will not be influenced, the interrupting process is released from the waiting condition, thereby improving the overall program throughput.

Also, in the third embodiment, because dependency relationships and precedence constraints between commands are extracted and detected from the concurrent program 11, in which an interrupt-enabled region specified, the interrupt-enabled part being extended based on the results thereof, the correctness of the concurrent program 17 is assured.

4. Fourth Embodiment (1) Configuration

Figure 18:
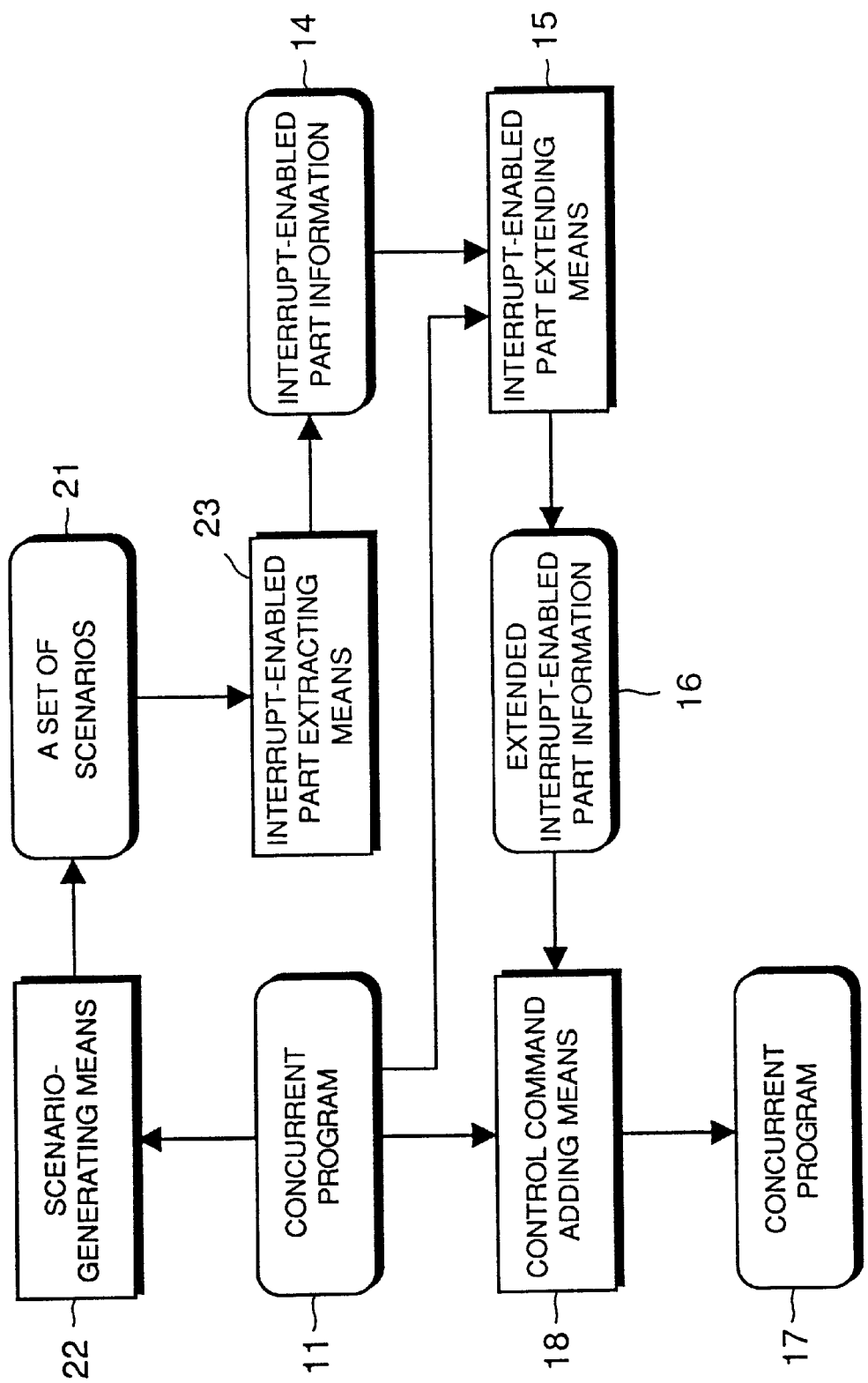
FIG. 18 is a functional block diagram which shows the configuration of the fourth embodiment of the present invention.

In the fourth embodiment of the present invention, a desired behavior of a concurrent program is represented as a set of scenarios, an interrupt-enabled part being extracted from the scenario (as recited in claims 6 and 12), and the interrupt-enabled part being extended (as recited in claim 8). FIG. 18 is a functional block diagram which shows the configuration of the fourth embodiment. As can be seen from this drawing, the fourth embodiment has a scenario-creating means 22 which, based on the concurrent program 11, creates a set of scenarios 21 which represents a desired behavior of the concurrent program, and a interrupt-enabled part extracting means 23 for extracting the interrupt-enabled part information 14 from the set of scenarios 21.

The fourth embodiment also has an interrupt-enabled part extending means 15 for extending the interrupt-enabled part of the concurrent program 11, and a control command adding means 18 which, by adding to the concurrent program 11 a control command that enables an interrupt at an interrupt-enabled part, outputs a concurrent program 17.

Figure 19:
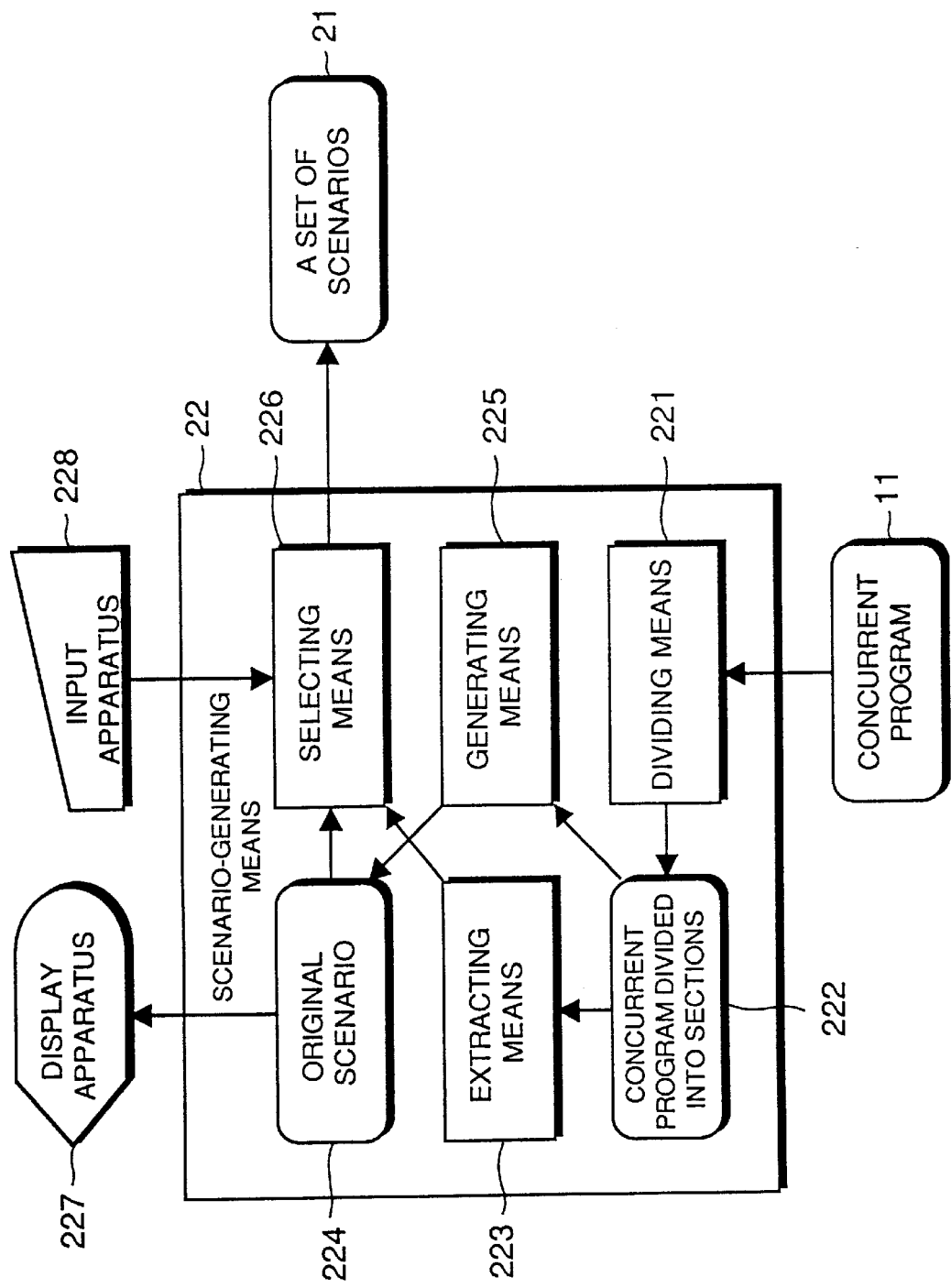
FIG. 19 is a functional block diagram that shows a specific configuration of the scenario generating means 22 in the fourth embodiment of the present invention.

FIG. 19 is a functional block diagram which shows a specific configuration of the above-noted scenario-creating means 22. As shown in this drawing, the scenario-creating means 22 has dividing means 221 which divides the source code for each process included in the concurrent program 11 into execution-controllable sections, and an extracting means 223 for extracting from the concurrent program 222, which is divided into sections, dependency relationships existing between divided sections. The scenario-creating means 22 also has a generating means 225 for generating a initial scenario 224 which represents one possible executable sequence of each above-noted section, and other possible executable candidates as branches to the sections, and a selecting means for selecting a section which should be executed first with regard to a branch that has a dependency relationship and for eliminating an unselected branch. The selecting means 226 displays the initial scenario 224 on a display apparatus 227 so as to have the user select the edge of a branch, and the user notifies the selecting means 226 of the section to be executed first by making input of the section from the input apparatus 228.

(2) Operation and Effect

Figure 20:
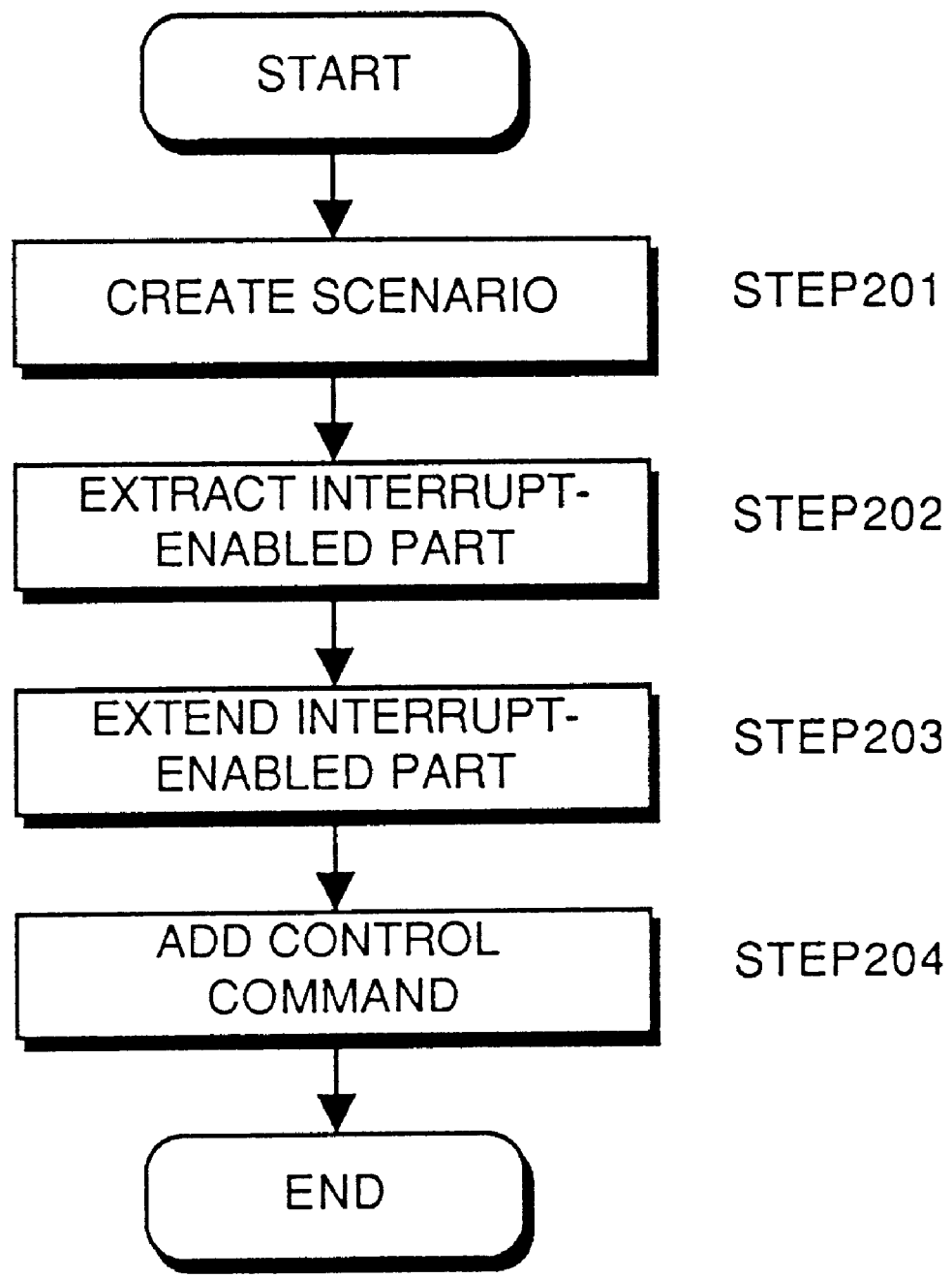
FIG. 20 is a flowchart which shows the processing sequence in the fourth embodiment of the present invention.

The operation and effect of the fourth embodiment, having a configuration as described above, are as follows. For example, in the case in which a concurrent program shown in FIG. 14 is given, such as is done in the case of the third embodiment, the following processing is performed. FIG. 20 is a flowchart which shows the processing sequence in the fourth embodiment.

(2-1) Scenario Creation

First, the scenario-creating means 22 creates a scenario of a desired behavior of the given concurrent program (step 201). Normally, there is a plurality of desired behaviors, the scenario of this embodiment being expressed as a set of scenarios 21. The scenario-creating means 22 creates the set of scenarios as follows. First, the dividing means 221 shown in FIG. 19 divides the source code into sections for each processes. A section is an execution-controllable unit, which can for example be a single command. Next, the extracting means 223 detects dependency relationships between the divided sections. The dependency relationship detection is performed by a method similar to that described with regard to the third embodiment.

Then, the generating means 225 creates the initial form of the scenario from the concurrent program 222 which is divided into sections. That is, the generating means 225 takes each section, starting at the top of the main process which is to be interrupted, and alternately creates nodes which represent states and edges which represent transitions between states. More concretely, the transition corresponds to a command of the program. A scenario which is created in this manner is in a form similar to the state transition diagram illustrated by way of an example in FIG. 21.

Specifically, from the first node an edge of the first dsection is extended, and a node of the next state is created at the destination of the edge, after which the same processing is continued for subsequent sections, the nodes and edges being created alternately. In the case in which a section which follows a node of a certain state involved as part of a dependency relationship, the edge extended from that node is branched to two sections that have a dependency relationship between them. In the case in which different execution paths exists for one and the same combination of sections, these merge at the destination that is the same node. By doing this, a state transition diagram that represents the network architecture is created.

The selecting means 226 displays the scenario created as described above to the user, via the display apparatus 227. The users studies all branches which represent sections having the dependency relationships, selects from two edges the section to be executed first, and deletes the other section. Each of the edges which extend from the deleted edge are automatically deleted up to immediately before the merging point with other paths. For a branch in which case either side can be executed first, both are maintained.

For example, in the case in which, immediately after a command in an interrupted process, the edge of the first command section of the interrupting process continues, if this edge is deleted, interruption is prohibited (disabled) at this location. In this manner, by deleted improper edges and paths extending therefrom, the remaining scenarios have only paths which follow a proper command execution sequence.

Figure 21:
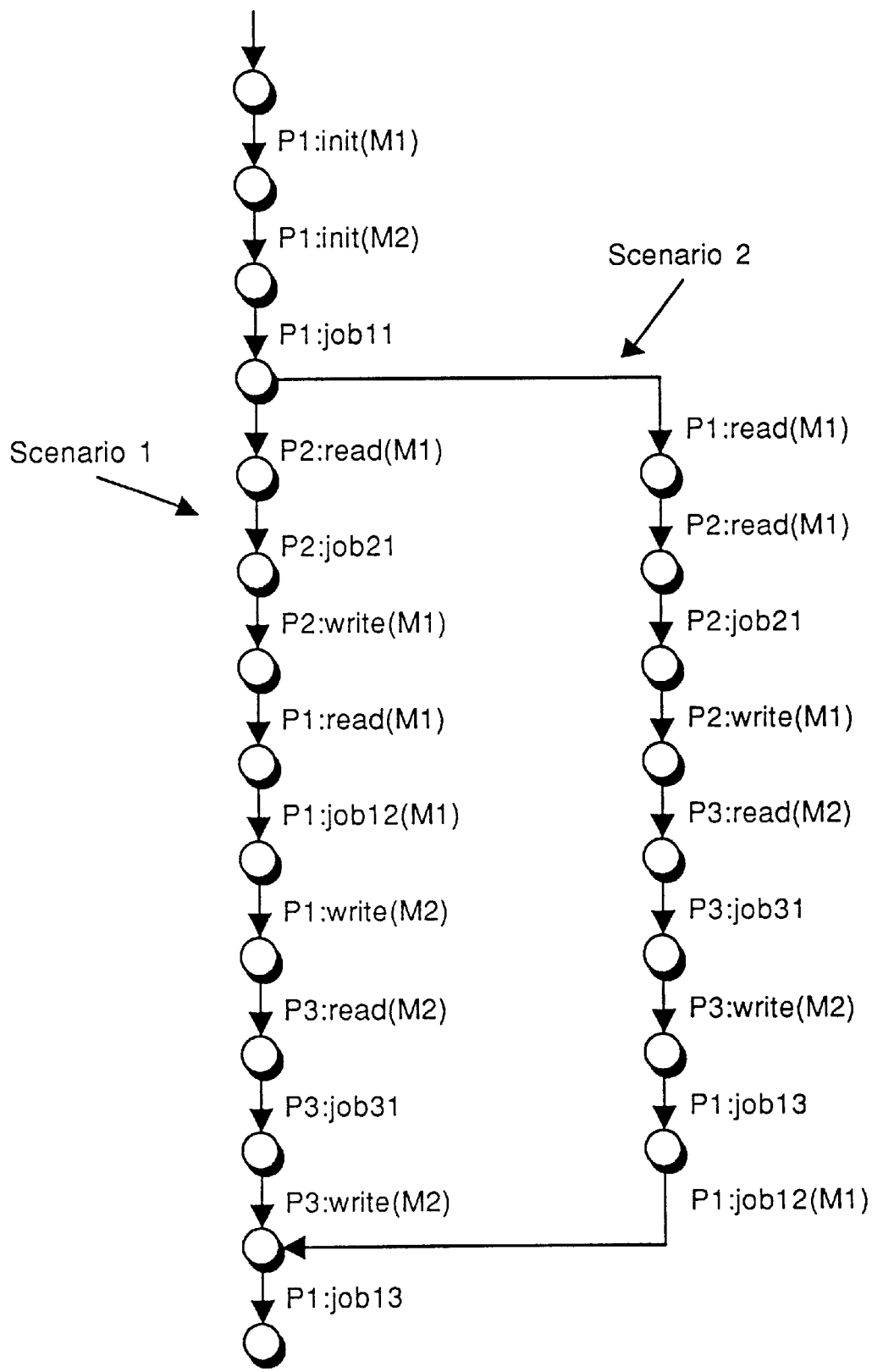
FIG. 21 is a drawing which shows a scenario generated in the fourth embodiment of the present invention.

According to the above-described processing, the set of scenarios 21 is expressed as a graph (scenario graph). FIG. 21 shows a thus-created scenario graph. As shown in this drawing, in the case in which a branch remains in the graph, a plurality of scenarios are included. Consider the case in which the two scenarios, Scenario 1 and Scenario 2 of FIG. 21 are created, the proper operation of these two scenarios being verified by the user. Another method of creating a scenario is to use as is the log of an execution that was performed properly as the scenario.

(2-2) Interrupt-Enabled Part Extraction

The interrupt-enabled part extending means 23 shown in FIG. 18 extracts the interrupt-enabled part by detecting, in the scenario created as described above, a location at which an interrupt occurs (step 202). Because the proper operation of this scenario should already have been verified, it is possible to set a location in the scenario at which an interrupt occurs as the interrupt-enabled part. In the case in which the location at which an interrupt occurs depends upon the particular scenario, the union set thereof is taken as the interrupt-enabled part. In the two scenarios of FIG. 21, an interrupt occurs at the following locations.

Scenario 1

A P2 interrupt occurs between job11 and read (Ml) of P1.

A P3 interrupt occurs between write (M2) and job13 of P1.

Scenario 2

A P2 interrupt occurs between read (M1) and job12 of P1.

A P3 interrupt occurs immediately after the P2 interrupt.

The union set of these locations at which an interrupt occurs is taken as the interrupt-enabled part. This interrupt-enabled part is equivalent to that which is specified explicitly by the programmer in FIG. 22(*a*).

(2-3) Interrupt-Enabled Part Extension

Figure 22:
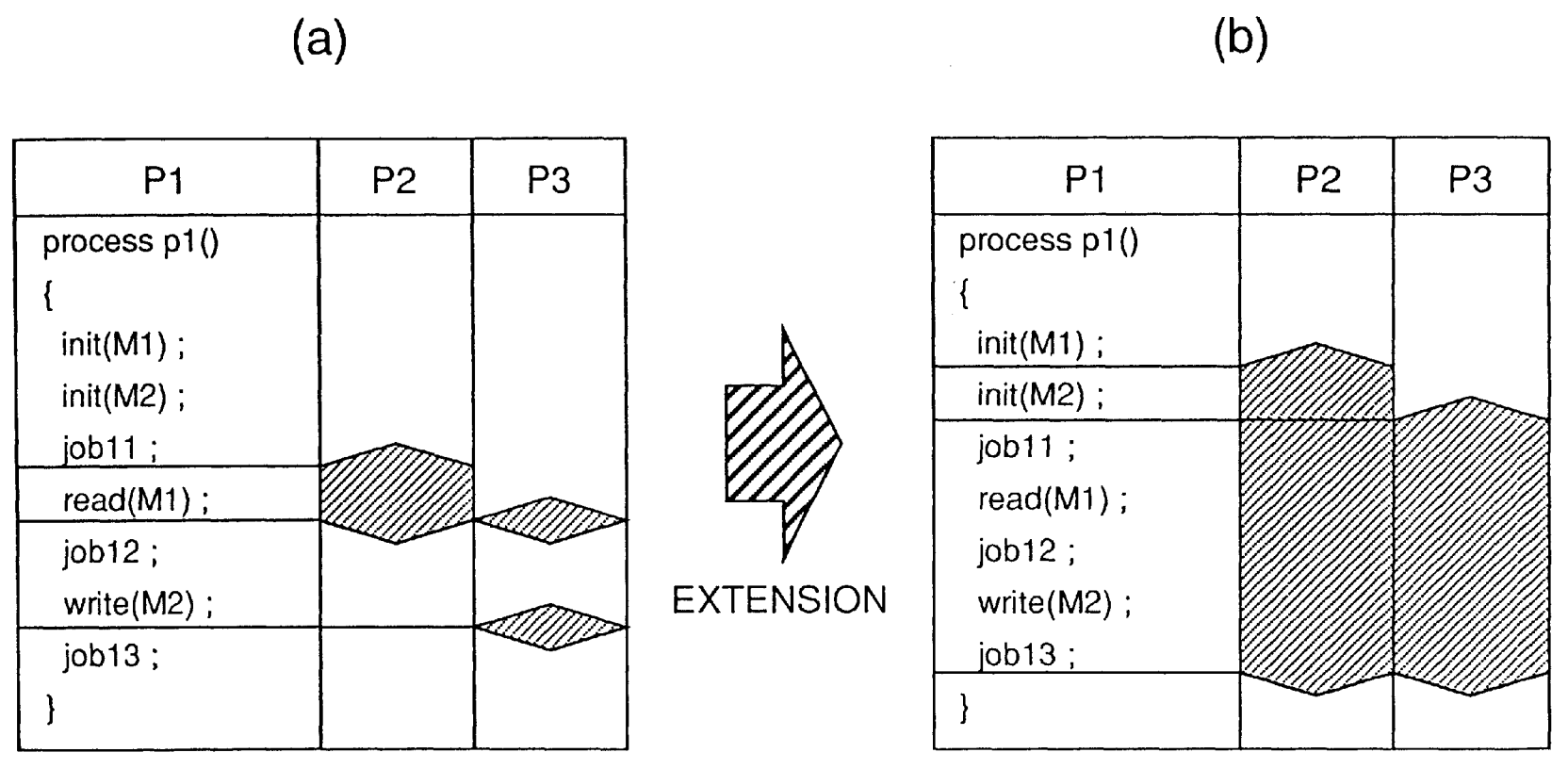

The interrupt-enabled part extending means 15 shown in FIG. 18 extends the interrupt-enabled part that was extracted as described above, using a method similar to that described with regard to the third embodiment (step 203). The extended interrupt-enabled part is as shown in FIG. 22(*b*).

(2-4) Control Command Addition

The control command adding means 18 shown in FIG. 18, based on the extended interrupt-enabled part, adds to the source code of the process P1 a control command for controlling the interrupt-enabled part. FIG. 23 shows an example of a concurrent program 17 to which a command has been added that controls interruption. Note that only process P1 is shown in FIG. 23, and P2 and P3 have not been shown, because there are no commands to be added to these processes. When this program is executed, interruption occurs only in the region shown in FIG. 22(b).

(2-5) Effect of the Fourth Embodiment

According to the fourth embodiment, having the configuration as described above, because a scenario such as used in hyper-sequential programming is employed in development of the concurrent program 17, an understanding of the contents of the concurrent program is facilitated, thereby improving reliability and the efficiency of the program development process. Additionally, because the extraction of the interrupt-enabled part is based on this scenario, the work load on the program developer is reduced.

Furthermore, in the fourth embodiment, the initial scenario 224 is created from the source code, a scenario which represents a desired and intended behavior of the concurrent program being created by the simple operation of selecting branches. For this reason, the fourth embodiment provides an improvement in concurrent program development efficiency.

5. Other Embodiments

The present invention is not limited to the above-described embodiments, and the embodiment can be freely varied as indicated in the following examples. For example, it is possible to apply the present invention to any program language, the programs and program languages shown in the foregoing embodiments being presented merely for the purpose of illustration. It is also possible to freely make changes in the display contents and format thereof. It is further possible to freely make other changes in the method of embodiment, such as with regard to whether the candidate specification is to be made by means of a pointing device such as a mouse, or by means of line number input from a keyboard.

Figure 24:
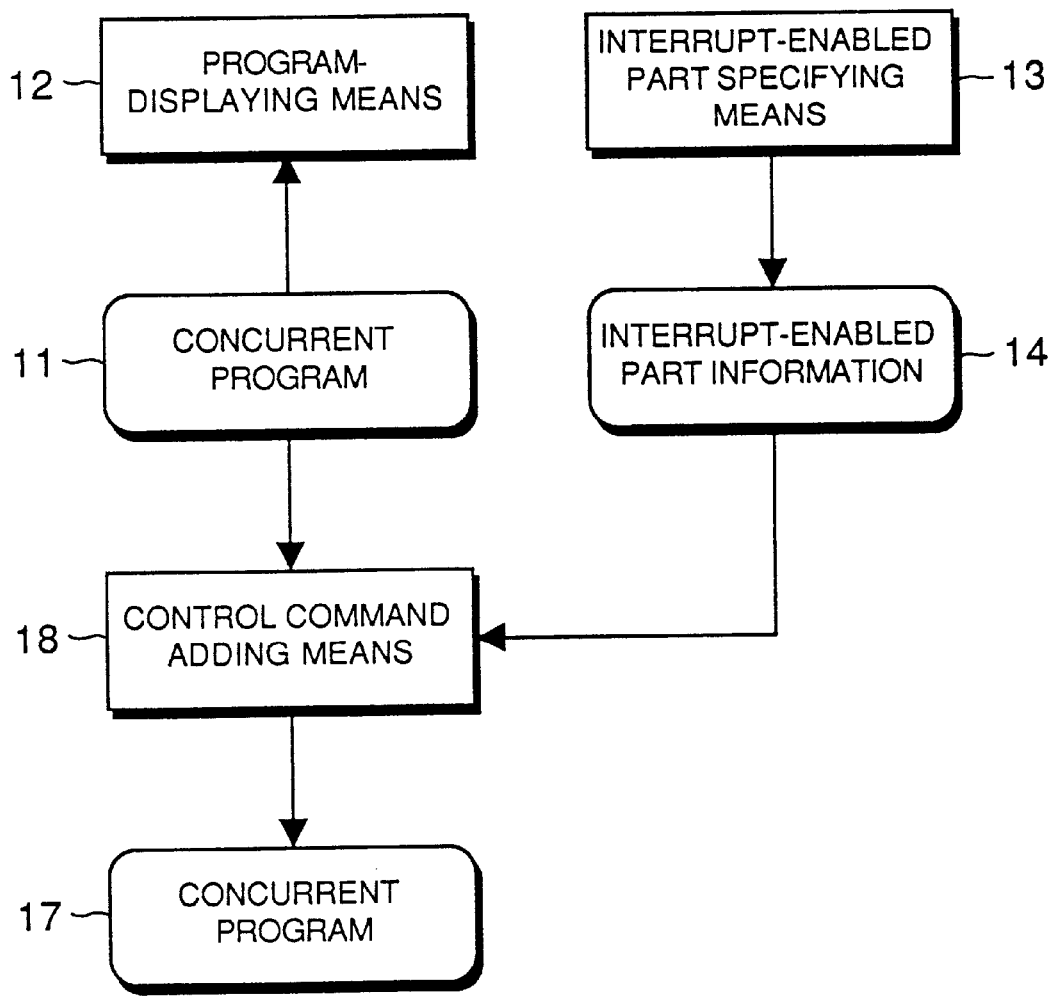
FIG. 24 is a functional block diagram which shows the configuration of an example of another embodiment of the present invention.
Figure 25:
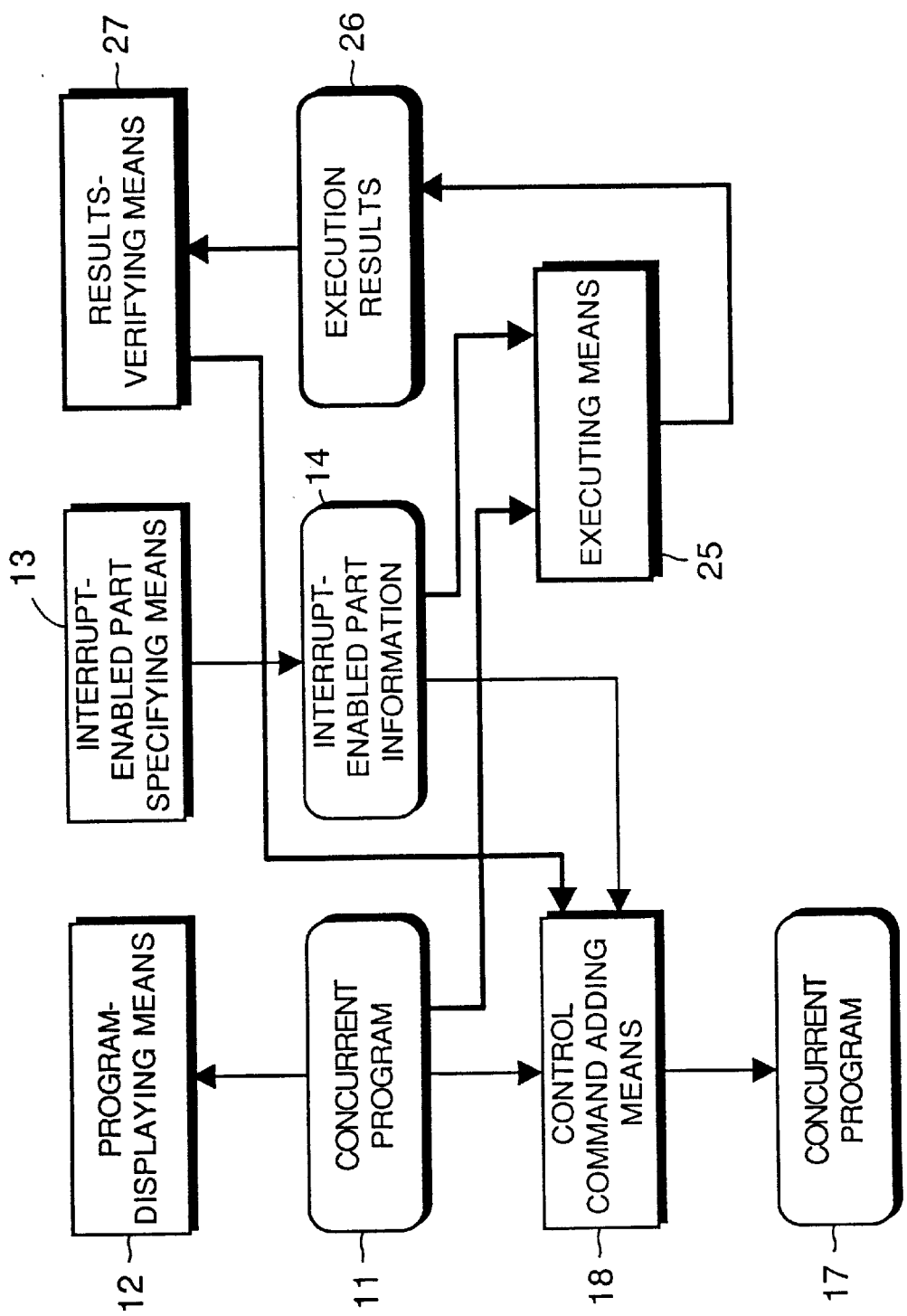
FIG. 25 is a functional block diagram which shows the configuration of an example of another embodiment of the present invention.

It is also not necessary to provide the interrupt-enabled part extending means 15 in the third embodiment, it being possible to use the configuration shown in FIG. 24 as well. In addition to the configuration which is shown in FIG. 24, it is possible, as shown in FIG. 25, to provide an executing means 25 for executing a concurrent program 11 based on interrupt-enabled part information 14, and a results-verifying means 27 for verifying the results 26 of the above-noted execution.

The executing means 25 can be implemented by sequential interpretation and execution of source code of a concurrent program under development as would be done in an interpreter-type of runtime environment. In the results-verification means 26, the user is informed of the execution results by display of the results on a display apparatus (not shown in the drawing), the user inputting whether or not the execution results are correct via an input apparatus such as keyboard or a mouse. In the case in which the execution results are input as being correct, the control command adding means 18, based on the interrupt-enabled part information 14, adds a control command to the concurrent program 11. In this manner, by using an interpreter format to execute a concurrent program under development, it is possible to perform precise program development by verifying the execution results.

To implement a simulated execution of a scenario, for example, for each path remaining on the scenario graph at a given point in time, the commands of the sections of the program corresponding to edges can be in the sequence of occurrence of the edges, in interpreter fashion. If a plurality of paths exists in a scenario, it is also possible to select an edge on a path to be followed by means of mouse clicking or the like.

Figure 26:
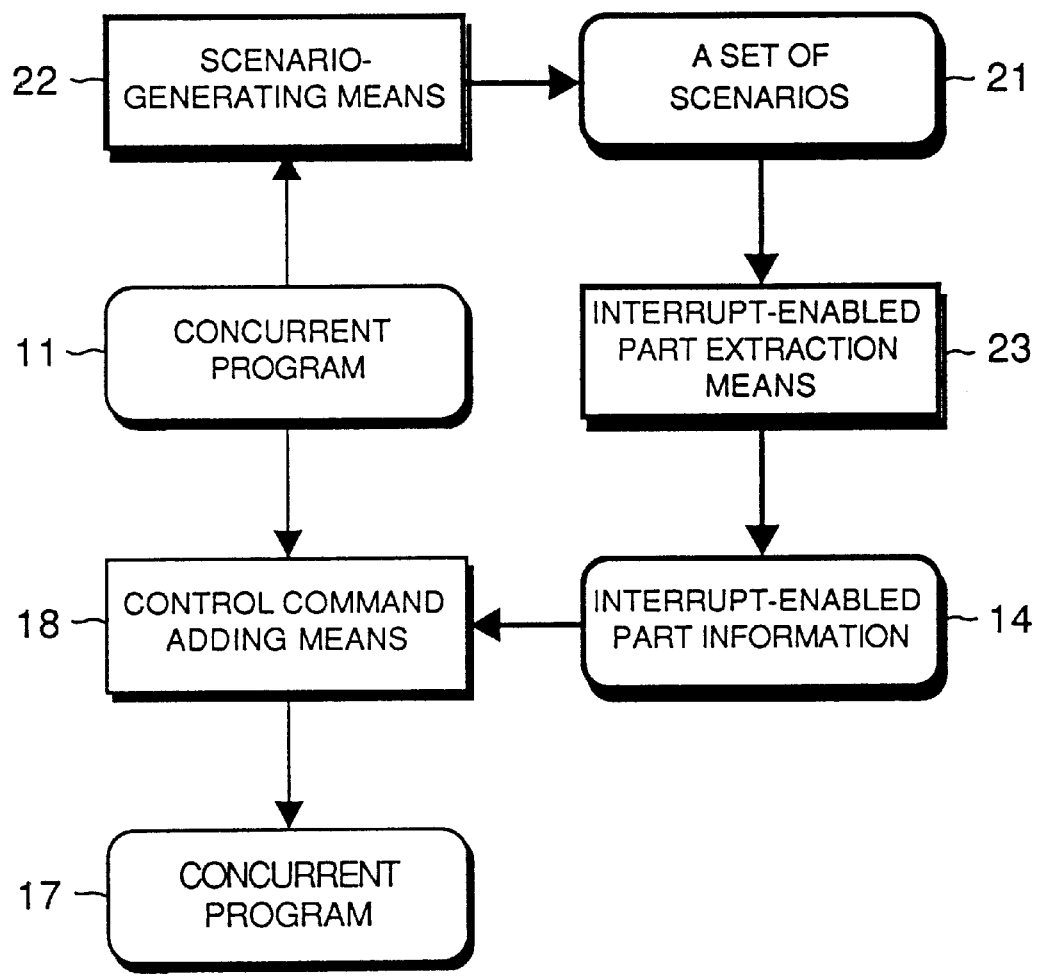
FIG. 26 is a functional block diagram which shows the configuration of an example of another embodiment of the present invention.

It is not necessary to provide the interrupt-enabled part extending means 15 in the fourth embodiment, it being possible to employ the configuration shown in FIG. 26 as well.

Figure 27:
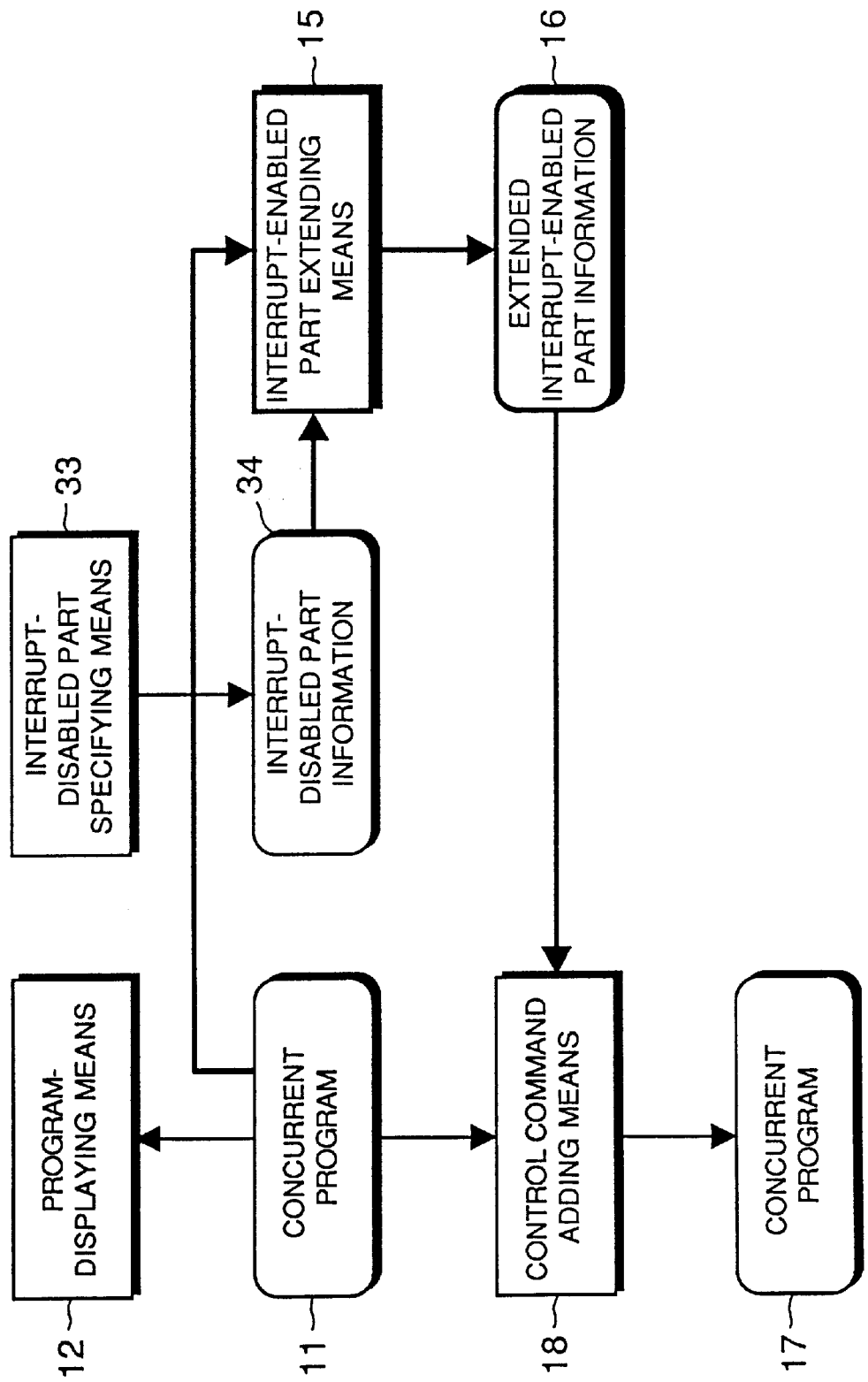
FIG. 27 is a functional block diagram which shows the configuration of an example of another embodiment of the present invention.

In place of the interrupt-enabled part specifying means 13 in the third embodiment, it is possible to provide a interrupt-enabled part specifying means 33 such as in the past, as recited in claim 10 and shown in FIG. 27. In this case, the complementary set of the interrupt-disabled part can be taken to be the interrupt-enabled part. For this reason, the interrupt-enabled part extending means 15 extracts from the specified interrupt-disabled part information 34 an interrupt-enabled part candidate part, based on a prescribed criterion, and the above-noted interrupt-enabled part, which is the candidate set, is extended up to the extracted candidate part.

It is generally envisioned that the present invention will be implemented by means of a computer program, a storage medium into which is stored such a computer program is yet another embodiment of the present invention.

As described above in detail, according to the present invention, it is possible to provide a program development support apparatus and program development support method which provide efficient support for the development of a highly reliable program.

What is claimed is:

1. A program development support apparatus for supporting the development of a program which includes a main task and an interrupt task which interrupts said main task, said apparatus comprising:

means for specifying a candidate location in source code of said program at which it is possible to allow execution of said interrupt task; and means for executing said program so that said interrupt task is executed at said candidate location, and for adding to said program an interrupt control command which allows execution of said interrupt task at said candidate location, according to results of said execution.

2. A program development support apparatus according to claim 1, wherein said specifying means is configured so as to specify as said candidate location a starting location and an ending location for the enabling of interruption, and wherein said adding means is configured so as to add to said program, as said interrupt control commands, an interrupt-enabling command corresponding to said starting location and an interrupt-disabling command corresponding to said ending location.

3. A program development support apparatus according to claim 1, wherein said specifying means is configured so as to specify said candidate location for each of a plurality of types of interrupt task, and wherein said adding means is configured so as to add to said program an interrupt control command which enables execution of an interrupt task which corresponds to each candidate location.

4. A program development support method for supporting the development of a program which includes a main task and an interrupt task which interrupts said main task, said method comprising:

performing processing for the purpose of specifying a candidate location within said program at which execution of said interrupt task can be enabled, performing processing for the purpose of executing said program so that said interrupt task is executed at said candidate location, and for adding to said program an interrupt control command which allows execution of said interrupt task at said candidate location, according to results of said execution.

5. A program development support apparatus comprising:

means for specifying a interrupt-enabled part in the source code of a concurrent program which includes a plurality of processes that are related to interrupt processing; and means for adding to said concurrent program a control command which allows execution of said interrupt task at a specified interrupt-enabled part.

6. A program development support apparatus comprising:

means, based on a scenario which represents a desired behavior of said concurrent program, which includes a plurality of processes related to interrupt processing, for extracting an interrupt-enabled part in said concurrent program; and means for adding to said concurrent program a control command which enables an interruption at said extracted interrupt-enabled part.

7. A program development support apparatus according to claim 6, comprising:

means for dividing source code for each process included in said concurrent program into execution-controllable section;

means for extracting a dependency relationship between divided sections;

means for generating an initial scenario which represents the possible execution order of each section, said means using branches to said sections; and means for selecting section to be executed first with regard to branches having said dependency relationship and for deleting branches that are not selected.

8. A program development support apparatus according to any one of claims 5, 6, or 7, further comprising means for extending an interrupt-enabled part of said concurrent program according to a prescribed criterion, by analyzing said concurrent program.

9. A program development support apparatus according to claim 8, wherein said extending means comprises:

means for extracting a dependency relationship between commands of said concurrent program;

means for detecting a precedence constraint between commands, based on a specified interrupt-enabled part and said extracted dependency relationship; and means for extending said specified interrupt-enabled part within said detected precedence constraint.

10. A program development support method comprising:

extracting from a part of a concurrent program in which interruption is disabled a candidate part in which it is possible to enable interruption;

extension of said candidate part to an interrupt-enabled part;

adding a control command which enables an interrupt at said extended interrupt-enabled part to said concurrent program.

11. A program development support method comprising:

specifying a part in which interruption is enabled in a concurrent program which includes a plurality of processes related to interrupt processing; and adding a control command which enables an interrupt at said specified interrupt-enabled part to said concurrent program.

12. A program development support method comprising:

extracting, based on a scenario which represents a desired behavior of a concurrent program which includes a plurality of processes related to interrupt processing, an interrupt-enabled part in said concurrent program; and adding a control command which enables an interrupt at said extracted interrupt-enabled part to said concurrent program.

13. A storage medium having stored in it a computer program which implements a program development support method which supports development of a program which includes a main task and an interrupt task which interrupts said main task, contents of said program, which is an implementation of said program development support method, comprising:

processing for the purpose of specifying a candidate location within said program at which execution of said interrupt task can be enabled, executing said program so that said interrupt task is executed at said candidate location, and adding to said program an interrupt control command which allows execution of said interrupt task at said candidate location, according to results of said execution.

14. A storage medium having stored in it a computer program which implements a program development support method, contents of said program, which is an implementation of said program development support method, comprising:

specifying a interrupt-enabled part of a concurrent program which includes a plurality of processes that are related to interrupt processing; and adding to said concurrent program a control command which allows execution of said interrupt task at a specified interrupt-enabled part.

* * * * *

UNITED STATES PATENT AND TRADEMARK OFFICE
CERTIFICATE OF CORRECTION

PATENT NO. : 5,956,511
DATED : September 21, 1999
INVENTOR(S) : Yasuyuki Tahara, et al.

It is certified that error appears in the above-identified patent and that said Letters Patent is hereby corrected as shown below:

On the Title Page, Item [75], in the Inventors, change "Tahara,", to --Tahara; Naoshi Uchihira, both of--.

In Claim 5, column 17, line 8, "a interrupt-enabled" should read --an interrupt-enabled--.

In Claim 14, column 18, line 47, "a interrupt-enabled" should read --an interrupt-enabled--.

Signed and Sealed this

Twenty-ninth Day of August, 2000

Attest:

Q. TODD DICKINSON

Attesting Officer

Director of Patents and Trademarks